United States Patent
Kennema et al.

(10) Patent No.: US 12,280,365 B2
(45) Date of Patent: Apr. 22, 2025

(54) DIE COMPRISING METAL PRINTED PARTS FOR THE EXTRUSION OF MOULDED BODIES

(71) Applicant: BASF SE, Ludwigshafen am Rhein (DE)

(72) Inventors: Marco Oskar Kennema, Ludwigshafen am Rhein (DE); Christian Walsdorff, Ludwigshafen am Rhein (DE); Fred Borninkhof, De Meern (NL); Matthias Johannes Wagner, Ludwigshafen am Rhein (DE); Bernd Schube, Ludwigshafen am Rhein (DE); Jochen Roerig, Ludwigshafen am Rhein (DE); Gerald Bastian, Ludwigshafen am Rhein (DE); Sabine Huber, Ludwigshafen am Rhein (DE); Marcelo Daniel Kaufman Rechulski, Ludwigshafen am Rhein (DE)

(73) Assignee: BASF SE, Ludwigshafen Am Rhein (DE)

( * ) Notice: Subject to any disclaimer, the term of this patent is extended or adjusted under 35 U.S.C. 154(b) by 986 days.

(21) Appl. No.: 17/056,753

(22) PCT Filed: May 17, 2019

(86) PCT No.: PCT/EP2019/062760
§ 371 (c)(1),
(2) Date: Nov. 18, 2020

(87) PCT Pub. No.: WO2019/219892
PCT Pub. Date: Nov. 21, 2019

(65) Prior Publication Data
US 2021/0154652 A1   May 27, 2021

(30) Foreign Application Priority Data
May 18, 2018 (EP) .................................. 18173206

(51) Int. Cl.
*B01J 37/00* (2006.01)
*B01J 35/56* (2024.01)
(Continued)

(52) U.S. Cl.
CPC .......... *B01J 37/0009* (2013.01); *B01J 35/56* (2024.01); *B28B 3/269* (2013.01); *B29C 48/11* (2019.02);
(Continued)

(58) Field of Classification Search
CPC .... B28B 3/269; B28B 2003/203; B29C 38/11
See application file for complete search history.

(56) References Cited

U.S. PATENT DOCUMENTS

| 6,215,093 B1 | 4/2001 | Meiners et al. |
| 6,316,383 B1 | 11/2001 | Tacke et al. |

(Continued)

FOREIGN PATENT DOCUMENTS

| DE | 19649865 C1 | 2/1998 |
| EP | 987058 B1 | 4/2002 |

(Continued)

OTHER PUBLICATIONS

Garrett Nelson, Richard A. Kirian, et al., "Three-dimensional-printed gas dynamic virtual nozzles for x-ray laser sample delivery," Opt. Express 24, 11515-11530 (2016) (Year: 2016).*
(Continued)

*Primary Examiner* — Seyed Masoud Malekzadeh
*Assistant Examiner* — Vipul Malik
(74) *Attorney, Agent, or Firm* — Faegre Drinker Biddle & Reath LLP

(57) ABSTRACT

The invention relates to a die (10) for the extrusion of catalyst molding, catalyst support molding, or adsorbent molding (60) in flow direction (32) of an extrudable composition from an entry side (12) to a discharge side (14) of
(Continued)

the die comprising a shell (56) and comprising one or more channel-formers (18) which are displacers of the extrudable composition and which extend in flow direction of the extrudable composition, wherein the channel-formers (18) have been metal-printed.

It is preferable that this is free from cavities for receiving extrudable composition which extend at right angles to the flow direction (32) of the extrudable composition, and that this is free from connections running at right angles from channel-formers (18) to the interior side wall (22) of the die (10).

The invention further relates to a process for the production, by means of 3D metal printing, of a metal-printed die (10) for the extrusion of catalyst moldings/support moldings (60).

14 Claims, 26 Drawing Sheets

(51) Int. Cl.
- *B28B 3/20* (2006.01)
- *B28B 3/26* (2006.01)
- *B29C 48/11* (2019.01)
- *B29C 48/30* (2019.01)
- *B33Y 10/00* (2015.01)
- *B33Y 30/00* (2015.01)
- *B33Y 70/00* (2020.01)
- *B33Y 80/00* (2015.01)

(52) U.S. Cl.
CPC .......... *B29C 48/3001* (2019.02); *B33Y 10/00* (2014.12); *B33Y 30/00* (2014.12); *B33Y 70/00* (2014.12); *B33Y 80/00* (2014.12); *B28B 2003/203* (2013.01)

(56) References Cited

U.S. PATENT DOCUMENTS

| | | |
|---|---|---|
| 7,582,588 B2 | 9/2009 | Van Den Brink et al. |
| 8,835,516 B2 | 9/2014 | Barthel et al. |
| 10,307,741 B2 | 6/2019 | Grüne et al. |
| 2005/0021727 A1 | 1/2005 | Matsunami et al. |
| 2005/0031727 A1 | 2/2005 | Matsuoka et al. |
| 2008/0138644 A1 | 6/2008 | Abbott, III et al. |
| 2009/0311470 A1* | 12/2009 | Hamatsuka ............ B29C 48/11 428/116 |
| 2010/0316856 A1 | 12/2010 | Currie et al. |
| 2019/0366585 A1 | 12/2019 | Nagai et al. |

FOREIGN PATENT DOCUMENTS

| | | | | |
|---|---|---|---|---|
| GB | 2073089 A | 10/1981 | | |
| WO | WO-2016156042 A1 * | 10/2016 | ............. | B01J 21/08 |
| WO | WO-2017087758 A1 * | 5/2017 | ............. | B28B 3/269 |
| WO | WO-2018155002 A1 * | 8/2018 | ............. | B22F 10/20 |

OTHER PUBLICATIONS

International Search Report for PCT/EP2019/062760 mailed Jul. 31, 2019.

Huang S et al. "Developing a new processing route to maufacture honeycomb ceramics with negative Poisson's ratio" Key Engineering Mater, Trans Tech Publications Ltd., Stafa-Zurich, CH, vol. 206-213, 2002, pp. 201-204.

International Preliminary Report on Patentability received for PCT Patent Application No. PCT/EP2019/062760, mailed on Sep. 2, 2020, 23 pages (9 pages of English Translation and 14 pages of Original Document).

* cited by examiner

DIE COMPRISING METAL PRINTED PARTS FOR THE EXTRUSION OF MOULDED BODIES

CROSS-REFERENCE TO RELATED APPLICATIONS

This application is a national stage application (under 35 U.S.C. § 371) of PCT/EP2019/062760, filed May 17, 2019, which claims benefit of European Application No. 18173206.6, filed May 18, 2018, both of which are incorporated herein by reference in their entirety.

The invention relates to dies with metal-printed parts for the extrusion of catalyst moldings, support moldings and adsorbent moldings, and also to a process for the production of the dies.

Heterogeneous catalysts can be used for chemical processes or exhaust-gas treatment systems, often in what are known as fixed beds. Unlike in fluid-bed processes, moving-bed processes or suspension processes, the catalysts generally used here take the form of shaped bodies rather than relatively fine-particle powders. The catalyst moldings can then either be individually fixed, for example in the form of monolithic blocks of what are known as honeycombs, as by way of example in automobile exhaust catalysis, or can be arranged in the form of a bed of many relatively small moldings, known as a catalyst bed.

Reactors used involving catalyst beds are typically tray reactors, bed reactors, tubular reactors or tube-bundle reactors. Typical moldings for catalyst beds comprise by way of example cylinders, hollow cylinders, star extrudates and trilobes.

EP 987 058 B1 describes by way of example catalyst moldings with a wheel-and-spoke structure, i.e. with a round shape and a plurality of sectoral cutouts arranged around a central axis. However, the dies used for the extrusion process are not disclosed.

Molded heterogeneous catalysts can be produced either by shaping of a catalytically active composition, or of an appropriate precursor, or by application of a catalytically active composition or of an appropriate precursor, to a previously molded support. Application of a catalytically active composition, or of an appropriate precursor, to a previously molded support is achieved by way of example by using coating processes or impregnation processes. Processes for the shaping of catalytically active compositions, or of support compositions, are tableting, extrusion or, in particular in the case of spheres, agglomeration, for example on a rotating pan.

The present invention provides the production of molded heterogeneous catalysts or of molded supports for heterogeneous catalysts, or of molded adsorbents. In particular, the invention provides the extrusion of such catalysts, supports or adsorbents.

The underlying principles of extrusion are widely described, for example in Charles N. Satterfield, Heterogeneous Catalysis in Industrial Practice, 2nd edn., McGraw-Hill 1991, or in J. F. LePage Catalyse de contact [Contact catalysis], Éditions Technip 1978. Production of catalyst moldings or of support moldings by extrusion is similar to typical processes for the production of molded noodles (pasta). A kneadable composition is pressed (extruded) by way of a press or transport screws through a plate provided with apertures. The shape of the extruded material in cross section perpendicularly to the extrusion direction is determined here via the shape of the apertures in the plate through which the material is extruded. This type of plate provided with apertures is termed a die.

The moldings produced by means of extrusion are generally subjected to a thermal treatment after extrusion. This can be simple drying, or else a treatment (calcination) at higher temperatures at which changes can also occur to the material of the moldings, for example with elimination of certain decomposition product (gases), or with development of certain crystalline phases, or physical properties, of the moldings. These thermal treatments are generally carried out in suitable ovens, batchwise or preferably continuously. Equipment used for this purpose can by way of example be tray ovens, belt driers, belt calciners or rotating tubes. The thermal treatment of the moldings can also be followed by a process step for sieving to remove small fragments (undersize) or agglomerated moldings (oversize) and automated step for drawer-off into suitable containers, for example drums or "big bags".

The design of the extrusion apparatus, or the size and geometry of the extruded molding, may allow extrusion of one or more moldings simultaneously alongside one another; the plate to which the composition to be extruded is conveyed in such cases has one or more apertures for the shaping of appropriate moldings. The apertures can be arranged directly in a plate. However, inserts having appropriate apertures are often used, these then being inserted into a larger plate which has appropriate cutouts or retention elements. Terms then often used in this case are dies (inserts) and die plate (plate for receiving and retaining the dies).

For the shaping of high-quality catalyst moldings or high-quality support moldings, the apertures in the dies generally require a certain minimal depth; the dies therefore require a certain minimal thickness in order to provide apertures of channel type or of bore type. During passage through these die apertures of channel type of or bore type, the extrusion composition then has an appropriate residence time to relax in the geometry of the molding.

As described in U.S. Pat. No. 7,582,588 B2, dies can by way of example be produced from stainless steel from polymers; polymers are preferred here for reasons of manufacturing technology, and can be produced for example by injection-molding processes after production of an appropriate preparatory material.

The complexity of the required dies is highly dependent on the desired shaping. Solid geometries, for example solid cylinders or strands with a star-shaped cross section, can be produced relatively easily in that the apertures of the dies have an appropriately round or star shape. Catalyst moldings with a helical shape can also, as described in U.S. Pat. No. 8,835,516 B2, be produced by extrusion, by using dies with appropriately shaped aperture channels.

Moldings in the form of hollow cylinders, or indeed with a plurality of bore-type apertures, require dies of correspondingly complex design. To achieve this, displacers with a shape corresponding to the bore-type apertures of the extruded moldings must be positioned in the die apertures in a manner that allows the extrusion composition to spread, in the die apertures, uniformly around the displacers with minimum restriction. At the same time, however, the displacers must also be secured in a manner sufficiently stable to avoid deformation or displacement thereof, or irreparable damage thereto, on exposure to the considerable forces acting in the extruder. The positioning of the displacers can be such that they terminate approximately in line with the plane of the discharge aperture of the dies; however, they can also project beyond said plane.

Dies for the extrusion of catalyst moldings of clover-leaf type with four bore-type cutouts, are described in WO 16/156042 A1. GB 2 073 089 A describes dies for the extrusion of pasta foods with hollow cylindrical shaping. However, the structure having parts with relatively small thickness dimensions is designed for, generally small-scale, production of fresh pasta, and for simple cleaning.

The rheological properties of the composition for the extrusion of catalysts and of supports often pose particular problems. Pasta in the food sector is produced from a small number of ingredients, for example durum wheat semolina or flour and water, and in industry that is generally produced in plants optimized for pasta. In contrast, catalysts and catalyst supports are often produced in what are known as multipurpose parts, in runs of varying length, between production of other catalysts or supports. They use a wide variety of materials, generally inorganic oxides. The flow behavior of these materials can vary greatly with temperature, or with the intensity and duration of the mechanical forces acting thereon. In general, therefore, it is advantageous to minimize deflection and turbulence during transport of the composition through the die. Extrusion quality can also be significantly impaired by dead volumes or regions in the dies where flow is reversed and therefore the composition to be extruded experiences a variety of residence times.

U.S. Pat. No. 7,582,588 B2 by way of example says that the entry side of the apertures of dies can be extended in the manner of a funnel in order to improve flow behavior. The design of dies can, and should, also include rheological considerations. In particular, theoretical models or EDV-assisted simulation methods, for example computational fluid dynamics (CFD) can also be used.

Production of dies for extrusion of complex-geometry catalyst molding or of complex-geometry support molding, i.e. in particular of dies that are equipped with a plurality of displacers and that are comparatively thin and have parts with small thickness dimensions, faces problems relating to manufacturing technology.

It is known by way of example that dies can be produced from plastics by injection molding, or else by combining a plurality of components produced by injection molding. However, a disadvantage of that type of production by injection molding is the relatively high entry hurdle, in particular if the intention is to produce only a small number of dies, or if the invention is to produce a wide variety of different dies for experimental optimization of a die design. Another source of restrictions is that it must be possible to remove the die after opening of the injection mold. This requirement can by way of example make it difficult or impossible to use injection molding for manufacture of dies with very twisted or incised shapes.

U.S. Pat. No. 8,835,516 describes by way of example the production of dies for catalyst production with a twisted, helical shape. For this purpose, injection molds are provided with appropriately helical pins (inserts) which, in order to permit removal of the finished die, must be unscrewed after shaping of the die and for opening of the injection mold.

Dies of the prior art can also be produced via treatments carried out on preforms, for example made of metal or plastic. By way of example, apertures can be drilled or milled into such preforms. However, here again manufacturing technology places narrow limits on the design of the dies.

However, according to the prior art, dies or components for dies can also be assembled additively from various components, for example assembled by welding or by methods involving screwthreads. By way of example, it is also possible to produce a die with a plurality of displacers for the production of clover-leaf-type catalyst moldings with four bores, as described in WO 16/156042 A1. In that case the die consists, as shown in FIGS. 1 and 2, of two components: a hollow body, the bore of which corresponds to the exterior shape of the extruded catalyst molding. The exterior shape of said hollow body is advantageously designed to permit one or more of said moldings to be inserted and secured into a die plate. A second component, which comprises the displacers, is then fitted into said hollow body in order to obtain the complete die. The design of hollow body and of insert is preferably such that they are held simply by insertion into one another in a manner such that the insert in particular cannot rotate relative to the hollow body around the axis of the extrusion direction. According to the prior art, the insert can by way of example be extruded in the injection-molding process or manufactured additively from a baseplate provided with aperture and rod-shaped bodies (displacer or channel-former) attached perpendicularly thereon. By way of example, a metal disk can be provided with one or more bores. For reasons related to drilling technology, said bores are typically circular and conical. It is also possible to produce non-circular apertures through overlapping of a plurality of bores. However, that is time-consuming, and production of a rheologically optimized die here encounters restrictions relating to manufacturing technology. A plurality of metal rods of appropriate length with an appropriately selected diameter can then be attached perpendicularly to the baseplate. This can by way of example be achieved by welding. Rods of suitable diameter for cutting-to-length for circular displacers are often available commercially. If the intention is to use displacers with more specific, for example star, shapes, additional manufacturing steps are required. Precise positioning of the rods and orientation precisely perpendicular to the metal disk is difficult in particular in the case of dies for catalyst moldings or support moldings which respectively have components with small thickness dimensions. Rheologically optimized die design is also subject to serious restrictions related to manufacturing technology.

It is therefore an object of the present invention to provide dies for the extrusion of catalyst moldings, of catalyst support moldings and of adsorbent moldings, and also to provide an efficient process for the production of such dies. The dies are in particular intended to be rheologically advantageous and to permit production of moldings with numerous channels and/or having parts with small thickness dimensions.

Another object of the present invention is to find a process for the optimization of catalyst molding, catalyst support molding or adsorbent molding, and of the dies required for production of these by means of extrusion, where with said process it is possible to provide a large number of alternative dies rapidly and inexpensively, and with the aid of which it is possible to carry out experimental investigation and assessment of the properties of the moldings and the extrusion behavior of the extrusion compositions with the dies. The knowledge thus obtained can be used in an interruptive process for the design of improved dies, which then in turn can be provided rapidly and inexpensively for experimental investigation and evaluation.

The object is achieved via a die (10) for the extrusion of catalyst moldings, of catalyst support moldings, or of adsorbent moldings (60) in flow direction (32) of an extrudable composition from an entry side (12) to a discharge side (14) of the die (10) comprising a shell (56) and comprising one or more channel-formers (18) which are displacers of the extrudable composition and which extend in flow direction of the extrudable composition, wherein the channel-formers (18) have been metal-printed.

In particular, dies for the extrusion of moldings with relatively complex geometries, i.e. in particular moldings with a plurality of, or particularly small or twisted bores parallel to the extrusion direction, are produced in the invention by means of 3D metal powder laser printing. The design of the dies produced in the invention here is preferably such that in the interior of the die the shapes of those surfaces of the dies or die components that come into contact with the extrusion composition are substantially rounded and substantially exhibit no angles ≤90°. In particular, the dies produced in the invention advantageously also have no sections or connecting webs oriented at right angles to the extrusion direction. In particular, therefore, the dies of the invention also advantageously have no sections similar to the perforated plates depicted in FIGS. 1 and 2, and also by way of example no right-angled connection of the internal wall of the die to the die sections acting as displacers. In another preferred embodiment of the dies of the invention for the production of moldings with a plurality of bores, it is also preferable that not all of the die parts (channel-formers) acting as displacers have direct connection to the internal wall of the die, these instead having connection to die parts that in turn have connection to the internal wall of the die (connecting webs).

In a preferred embodiment, therefore, the channel-formers (18) which are displacers of the extrudable composition have been secured by way of one or more connecting webs (36) on an interior side wall (22) of the die (56) or have a connection (30) to one another where the channel-formers (18) and connecting webs (36) have been metal-printed.

In an embodiment to which preference is further given, the die (10) is free from cavities for receiving extrudable composition which extend at right angles to the flow direction (32) of the extrudable composition.

In an embodiment to which preference is further given, the die (10) is free from connections running at right angles from channel-formers (18) to the interior side wall (22) of the die (10).

The preferred embodiments mentioned are rheologically advantageous. Production of the unit (34) in which the channel-formers and connecting webs are present, or of the entire die (10) by 3D metal printing is subject to only slight restrictions relating to manufacturing technology.

It is therefore possible, at low cost, to produce design variants of dies which are likely to be advantageous on the basis of rheological considerations or simulation calculations, for experimental testing of the design.

Design variants of catalyst moldings, or of support moldings and of adsorbent moldings where these appear to be advantageous on the basis of simulations or theoretical considerations either rheologically or with regard to transport of material, pressure loss or bulk density can likewise, at low cost, be produced and tested experimentally.

Dies or die components designed with the aid of CAD (computer aided design) can be produced directly via appropriate computer-file- and software-based control of the manufacturing process.

The invention also provides a process for the production, by means of 3D metal printing, or the metal-printed die (10) or of a metal-printed insert (34), of a die (10) for the extrusion of catalyst molding, catalyst support molding, or adsorbent molding (60), with at least the following process steps:

a) application of a metal powder in successive layers,
b) before application of a subsequent metal powder layer, irradiation of the preceding powder layer with a laser in a prescribed region,
c) melting of the metal powder in the prescribed region over the entire layer thickness of the metal powder layer of said region by the energy introduced in step b), and formation of a compact metal layer bonded to the compact metal layer located thereunder,
d) by alternating application and melting of a plurality of powder layers on top of one another, production of the metal-printed die (10) or of the metal-printed insert (34) as combination of molten layers composed of the metal powder layers applied on top of one another.

The process preferably comprises the additional steps of:
e) experimental investigation of the die (10) in respect of the flow behavior of the extruded composition in the die (10),
f) repeated conduct of the steps a) to e) and optionally f), where the structure of the die (10) is altered.

In a preferred embodiment it is also possible to use a 3D metal-printing approach to achieve simultaneous production of dies with different design together (in a powder bed). This permits rapid and inexpensive production of a large number of dies in order to investigate and assess their suitability for production of catalyst moldings, of catalyst support moldings, or of adsorbent moldings by means of extrusion. It is firstly possible here to investigate the moldings themselves with regard to their physical and/or chemical properties, for example pressure loss, or activity of a bed comprising the moldings. Secondly the dependency of the extruded behavior of the relevant extrusion composition on the design of the dies can be investigated and assessed. On the basis of these experimental results, optionally with assistance from models or from arithmetical methods, improved die designs can be devised which in turn can be correspondingly experimentally investigated and assessed.

The invention also provides a process for the development of new catalyst moldings, catalyst support molding or absorbent molding (60) produced by means of extrusion with the steps of:

(i) production of a plurality of different dies (10) with different structure by the process described above, where the dies (10) can be produced simultaneously or in succession,
(ii) extrusion of various moldings (60) with the various dies (10),
(iii) experimental investigation of the various moldings (60) with regard to their physical and/or chemical properties in a bed,
(iv) optionally repetition of the steps (i) to (iii), where the design of the dies (10) is altered.

In a preferred embodiment of the die (10), some of the channel-formers (18) have connection to one another.

The die (10) can have only one channel-former (18). The die (10) frequently has 2 to 20 channel-formers (18) parallel to the flow direction (32) of the extrudable composition.

The channel-formers (18) extending in flow direction (32) of the extrudable composition can all have the same diameter or can have different diameters, for example first and second diameters (26, 28) different from one another. They can have a circuit (52) or a polygonal shape (54).

The die (10) can be composed of a metal-printed insert (34) in which the channel-formers (18) and connecting webs (36) are present, and of the shell (56) which is manufactured separately.

In a preferred embodiment, the shell (56) has been manufactured from a plastics material, preferably Teflon.

The invention also provides the metal-printed insert (34) with channel formers (18) and with connecting webs (36) for production of the die (10) from separately produced insert and separately produced shell (56).

The die (10) comprising the shell (56) and comprising the channel-formers (18) connected to the interior side wall (22) thereof by way of connecting webs (36) can also have been manufactured from a single piece, where the entire die has been metal-printed. The shell (56) can have an exterior jacket (58) which serves to retain the die (10). This exterior jacket (58) can have been manufactured from a plastics material, preferably Teflon.

The figures depict examples and embodiments of the invention, which are explained in more detail in the description below, in which.

Figure 1:
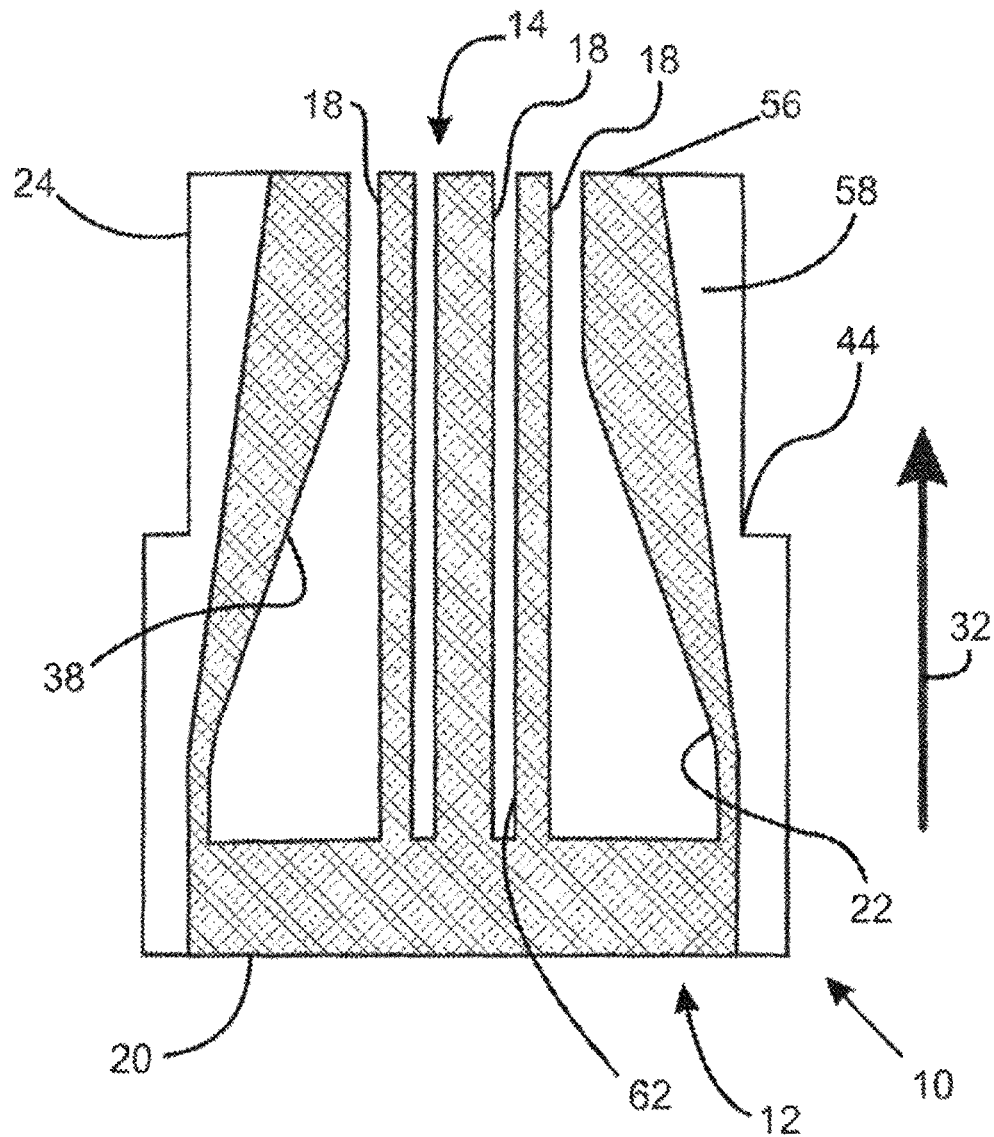
FIG. 1 shows a die of the prior art in longitudinal section
Figure 2:
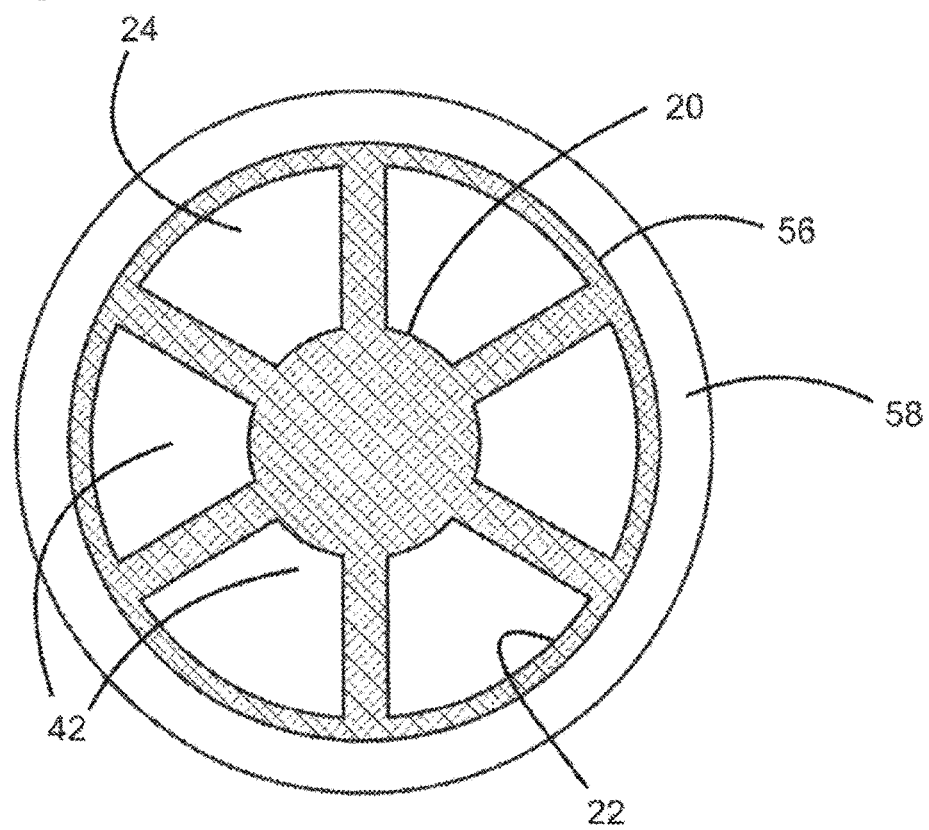
FIG. 2 shows a die of the prior art in plan view of the entry side
Figure 3:
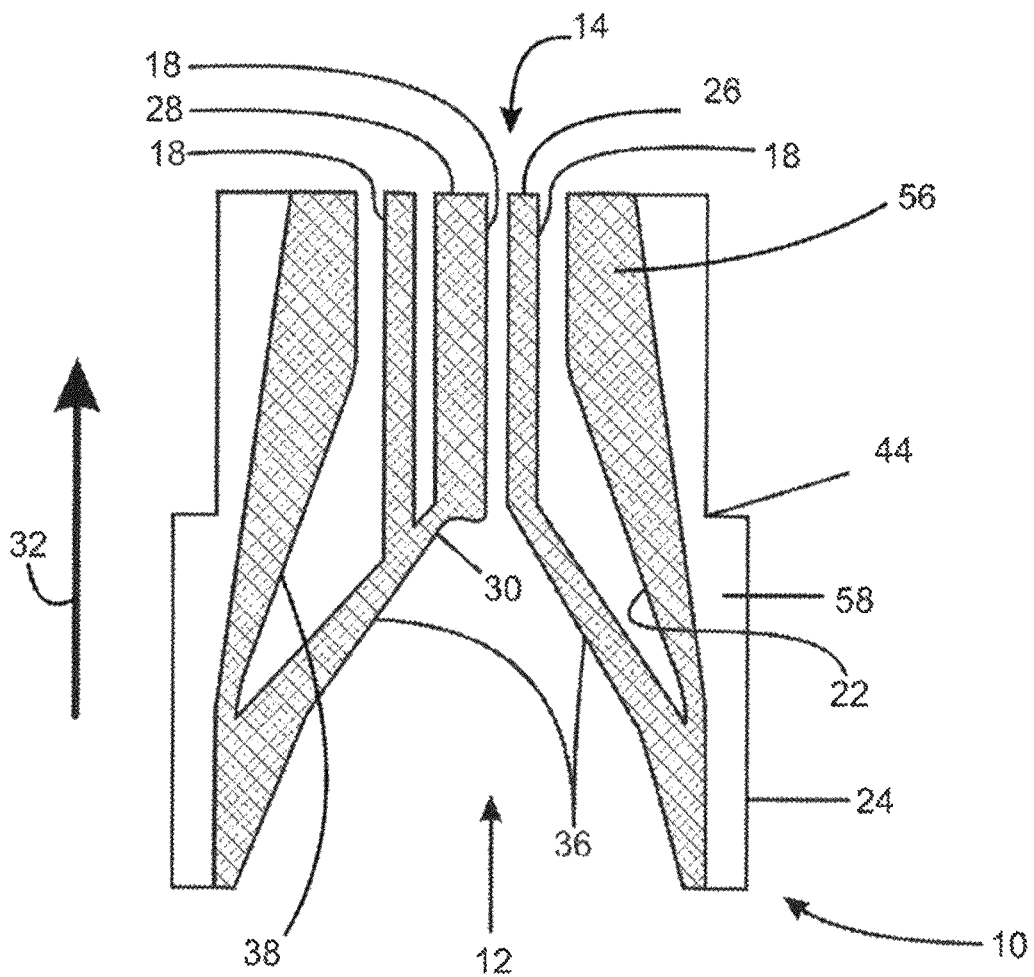
Figure 4:
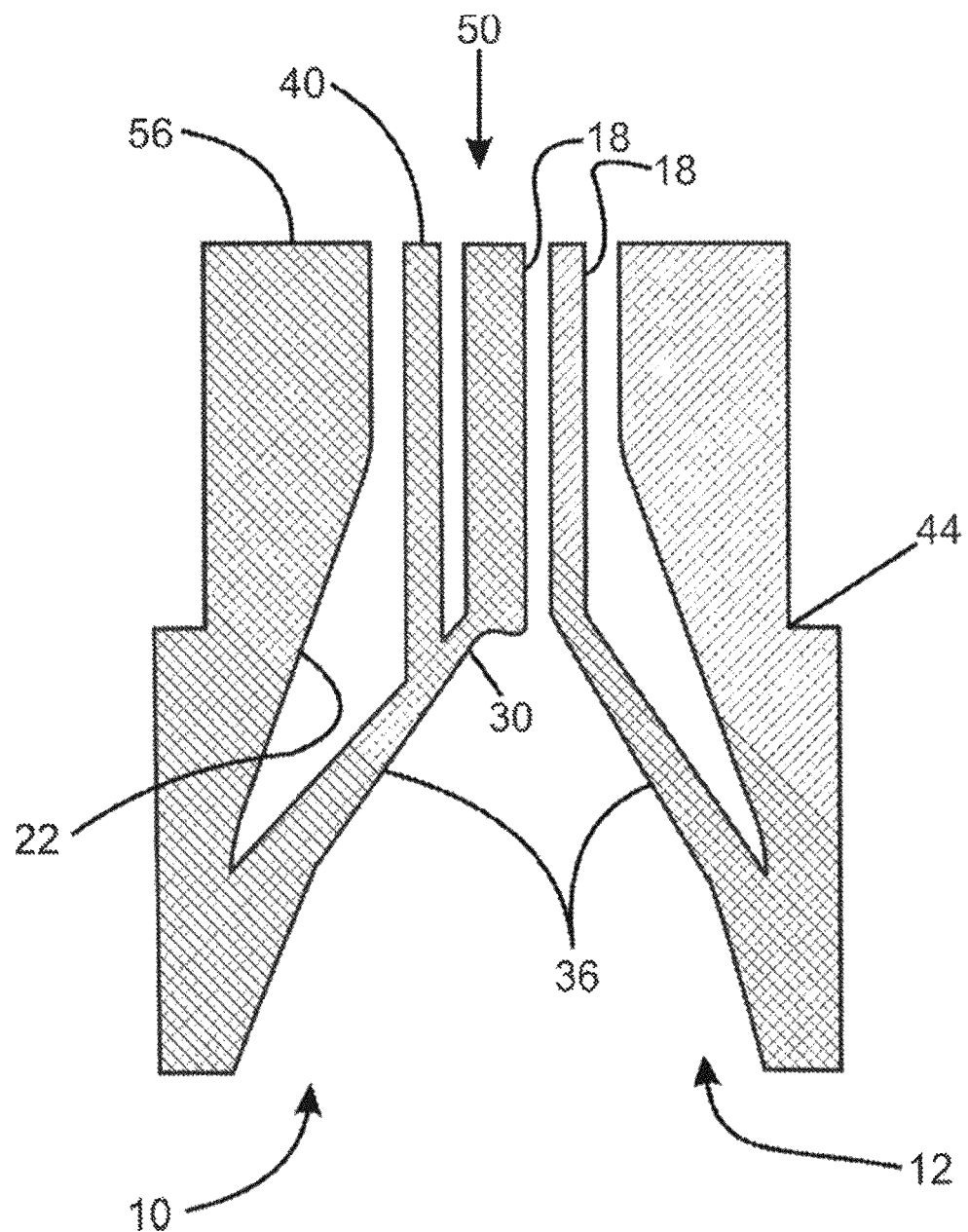
Figure 5:
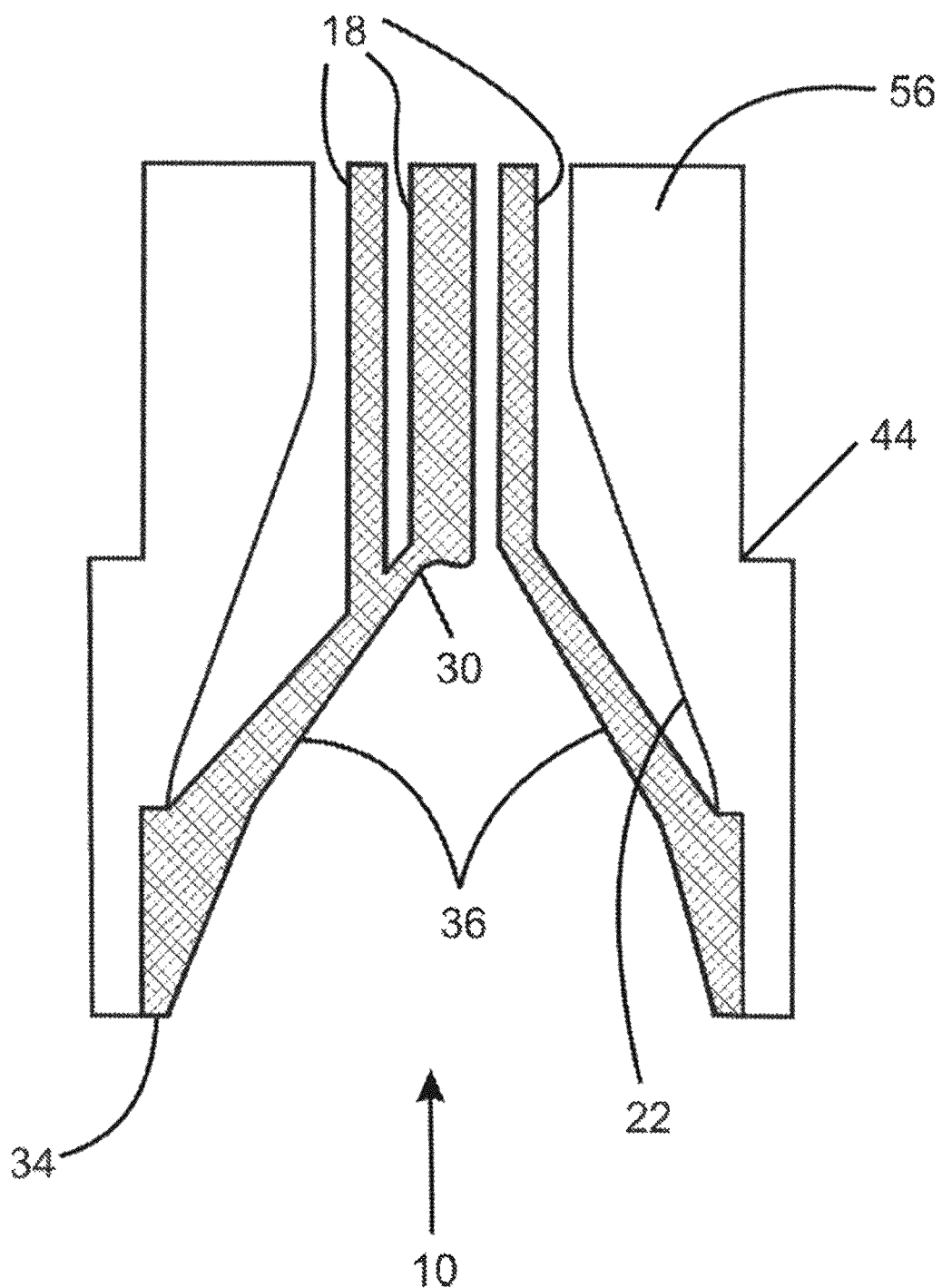
Figure 6:
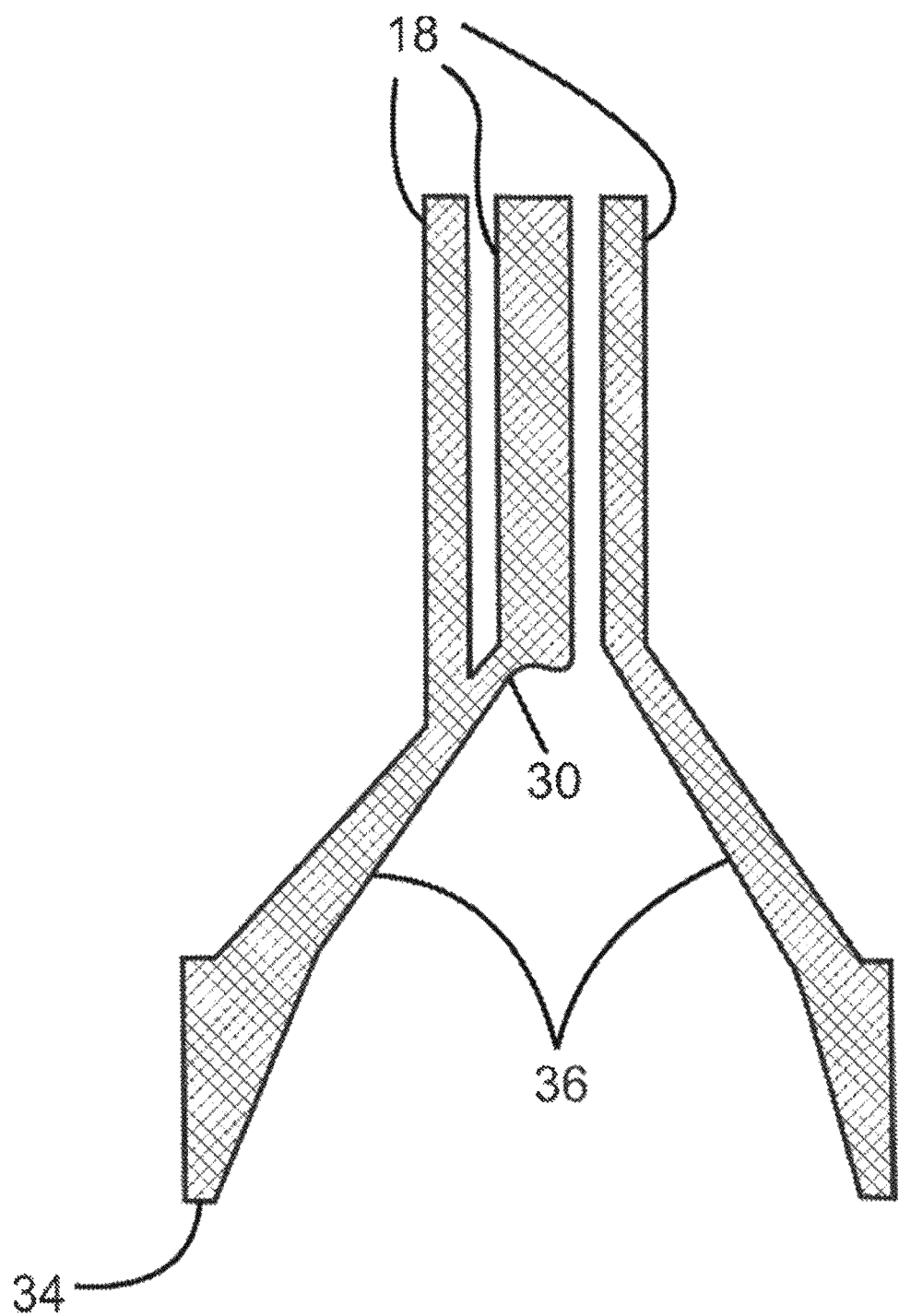
Figure 7:
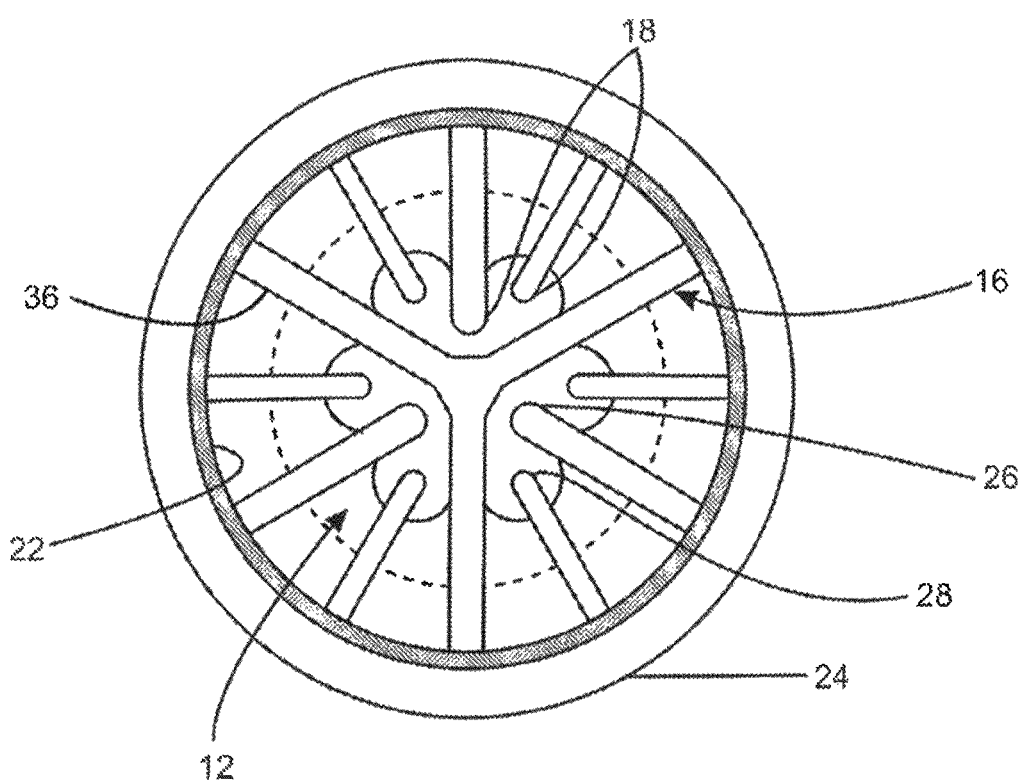
Figure 8:
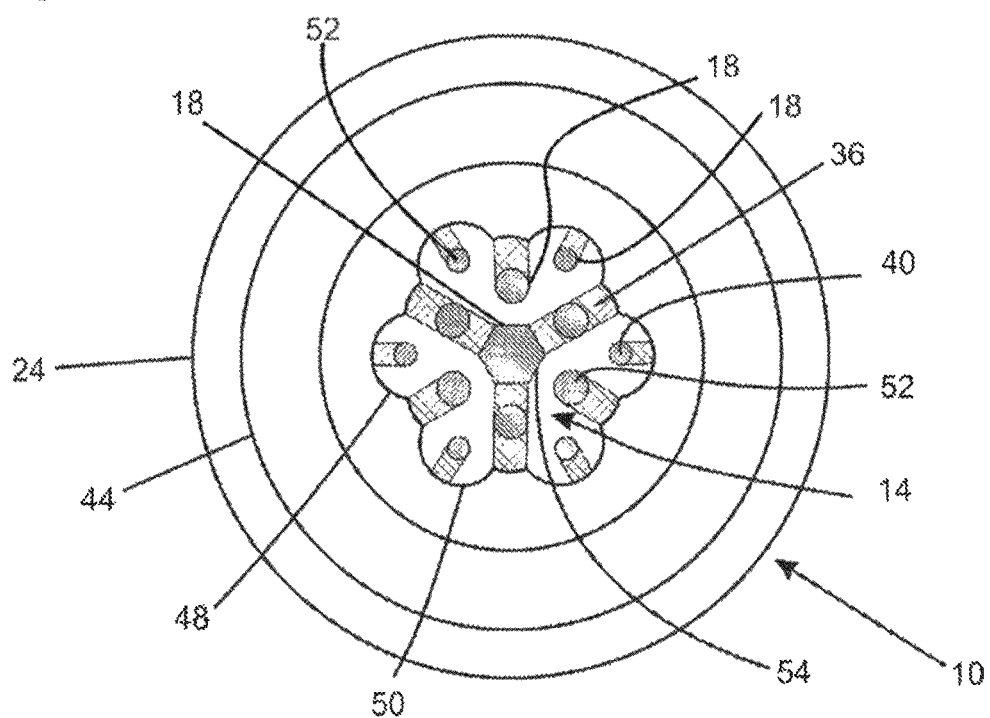
Figure 9:
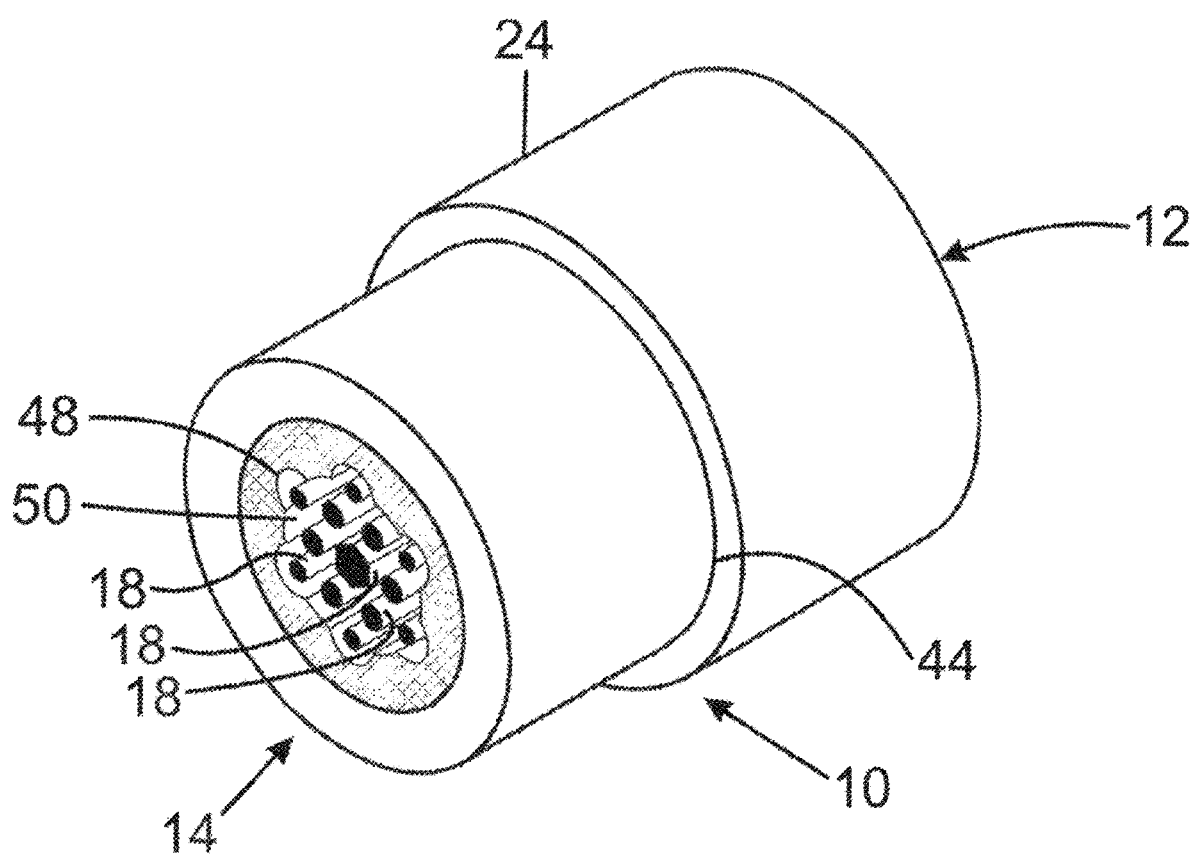
Figure 10:
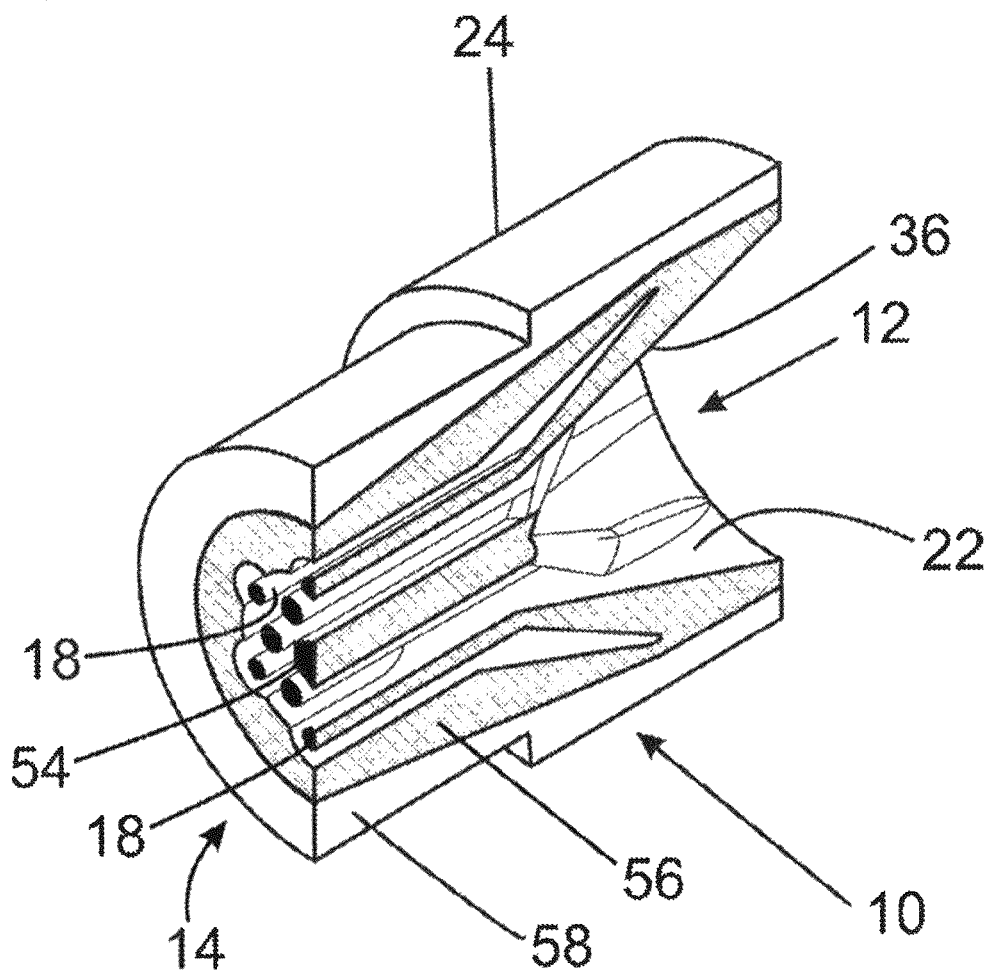
Figure 11:
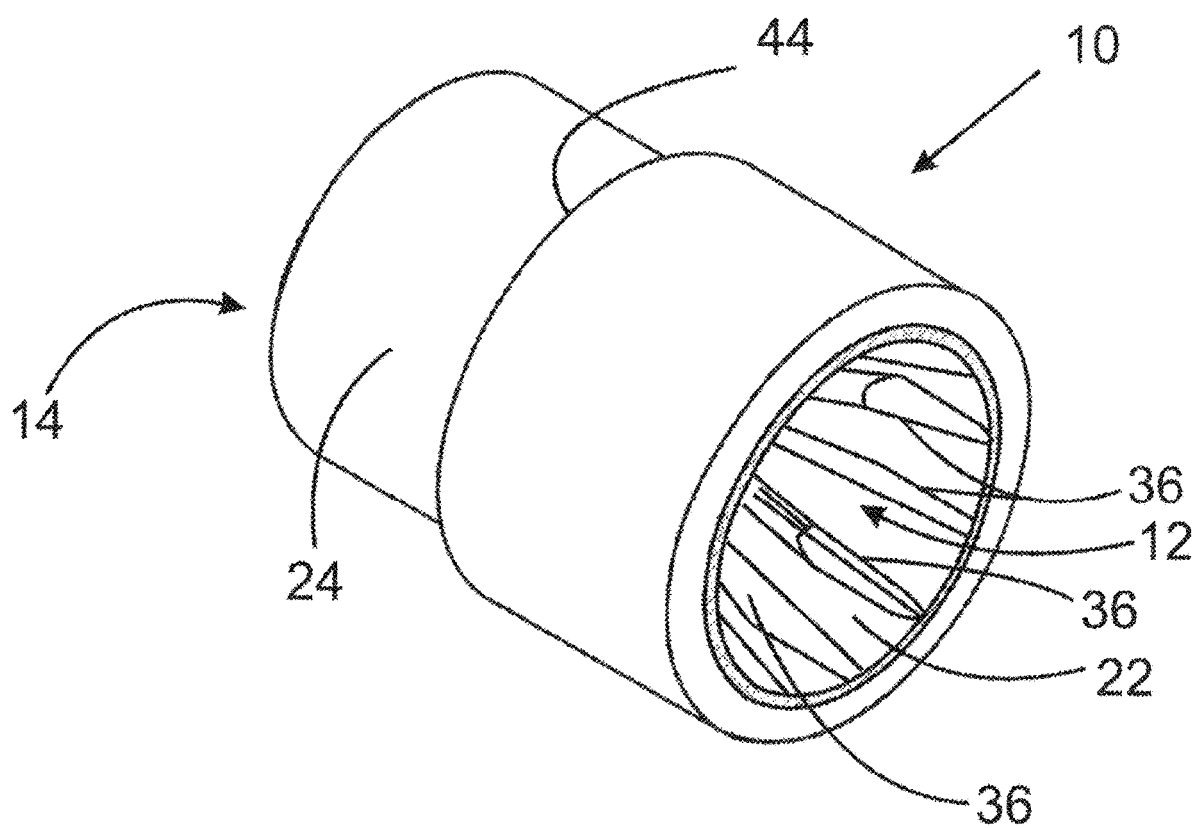
Figure 12:
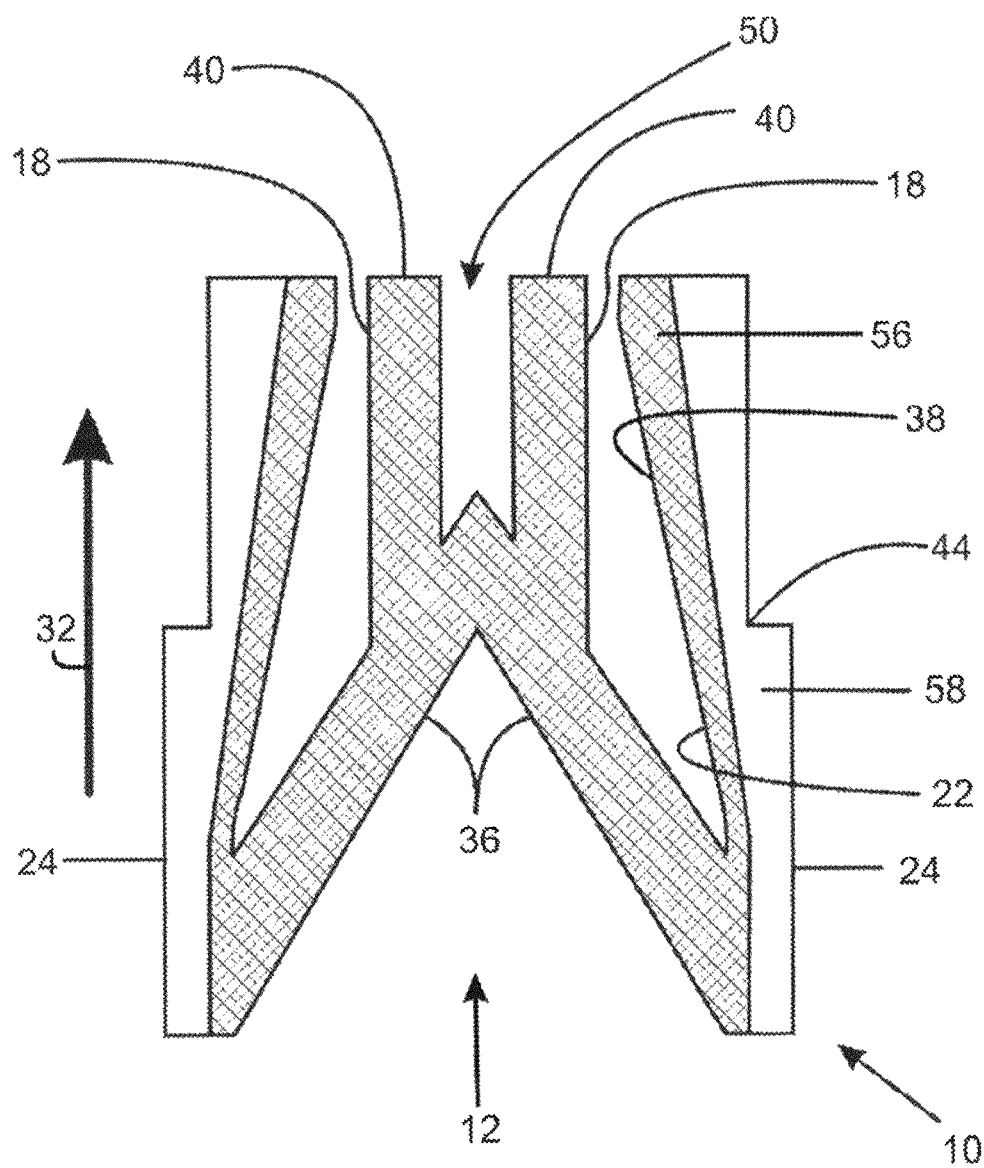
Figure 13:
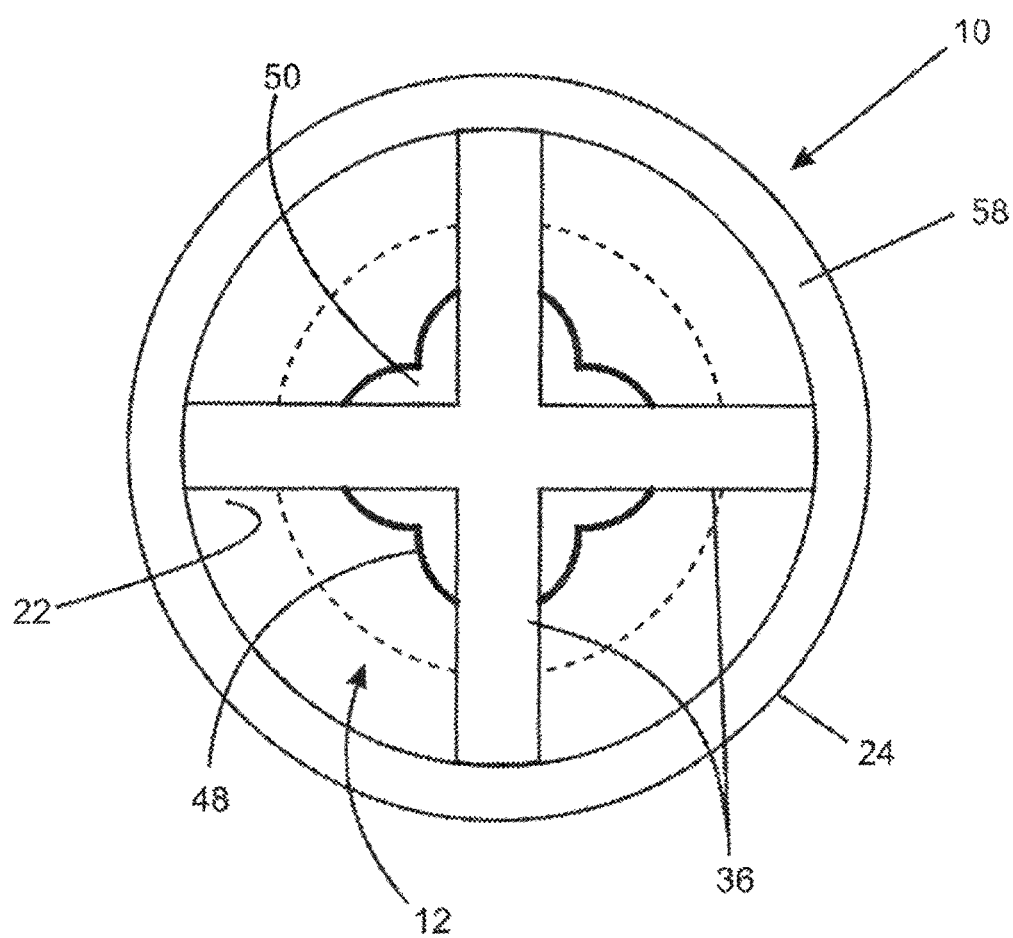
Figure 14:
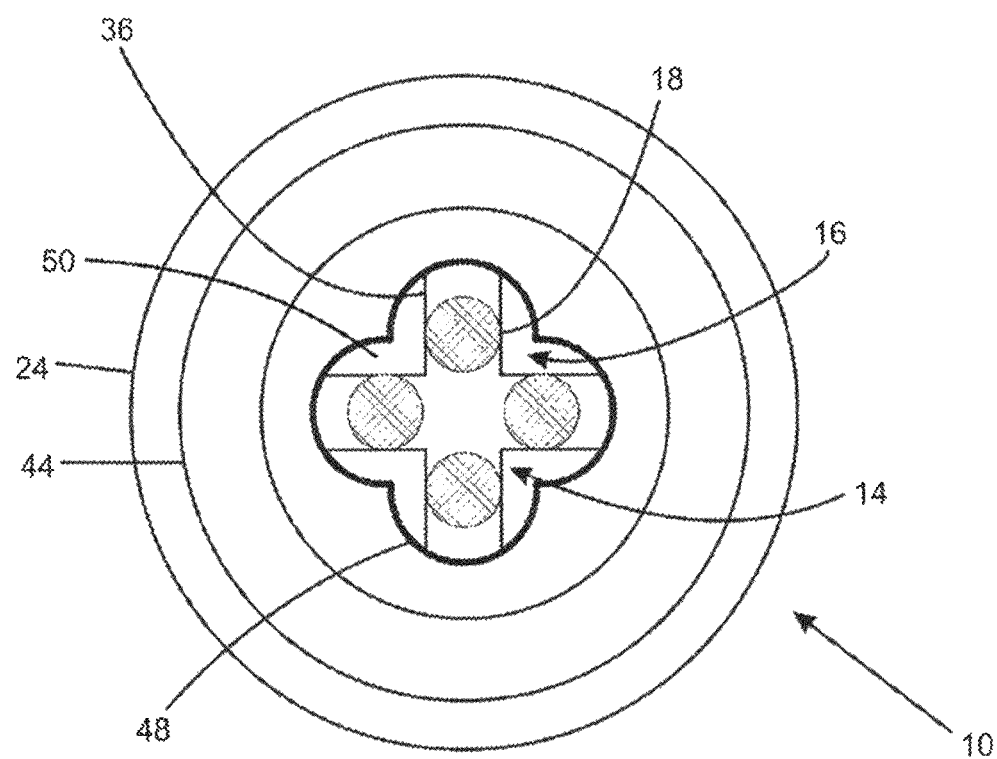
Figure 15:
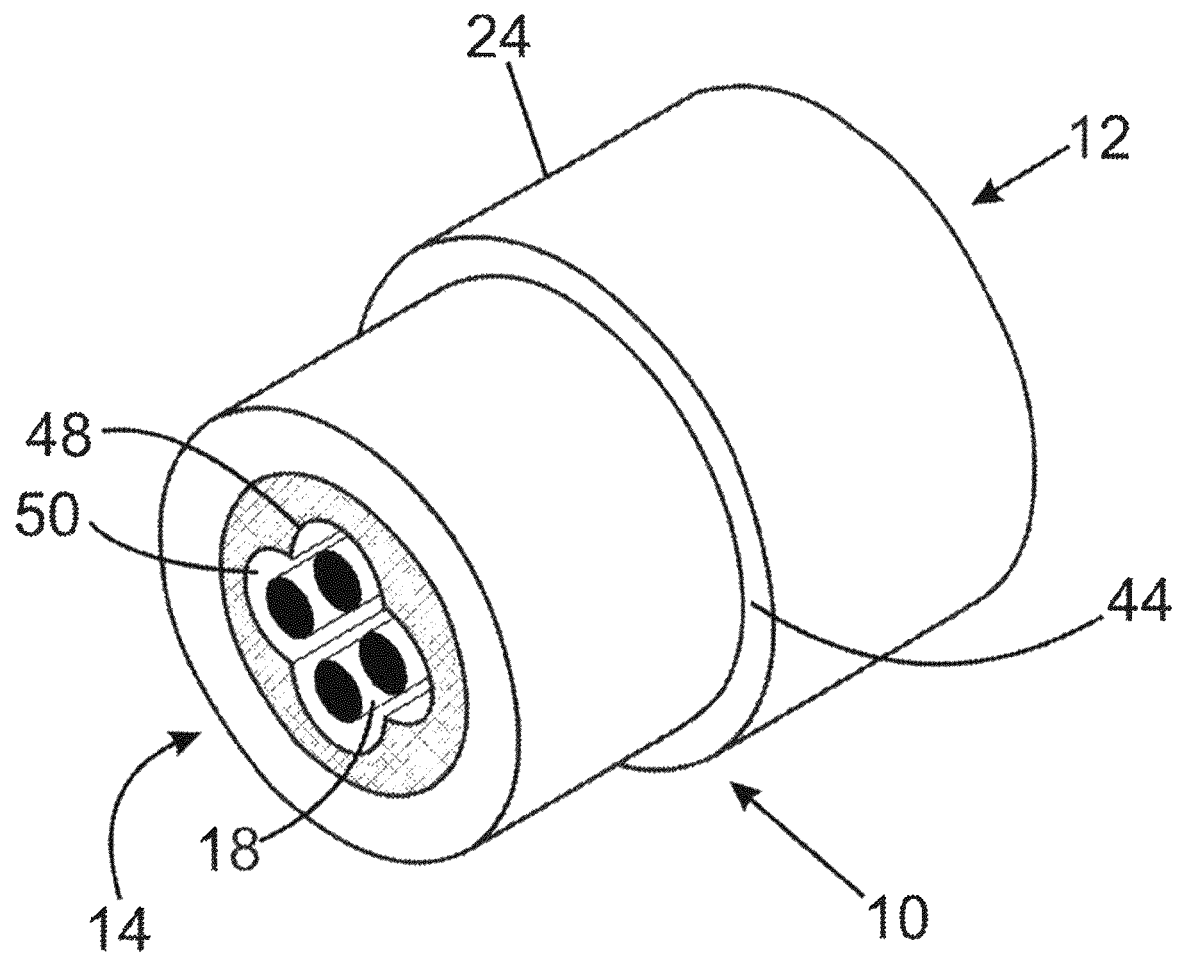
Figure 16:
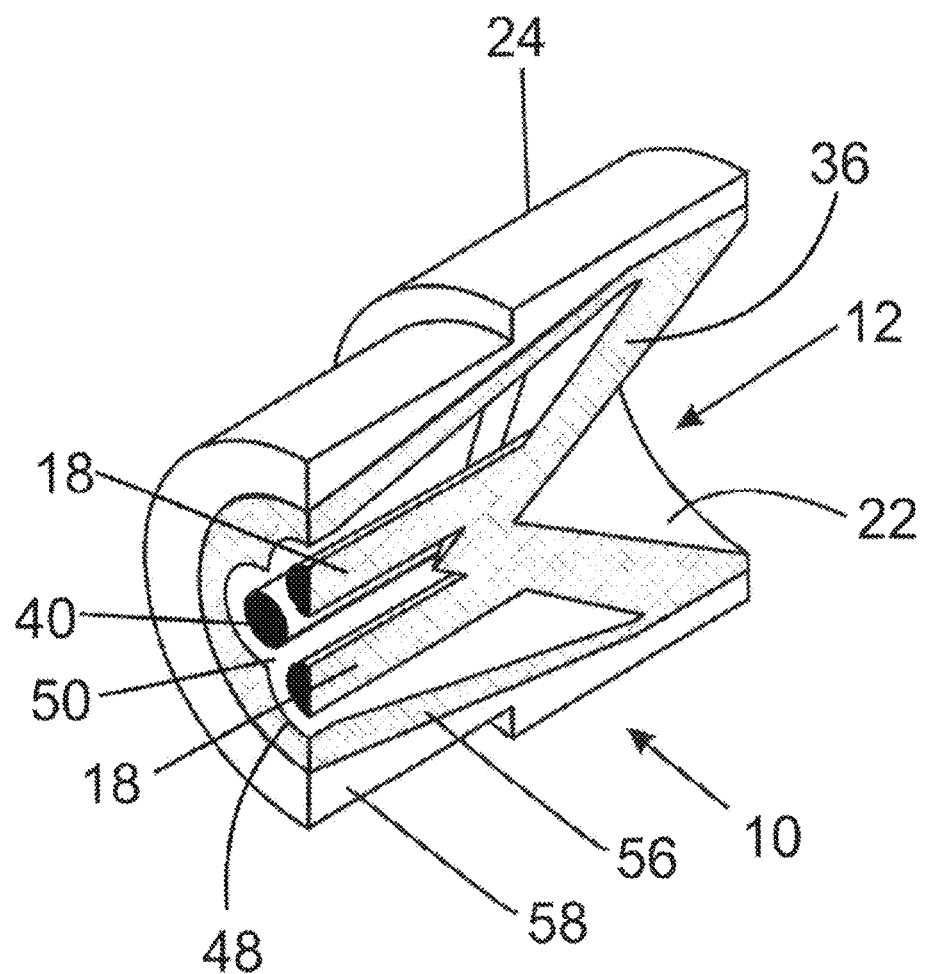
Figure 17:
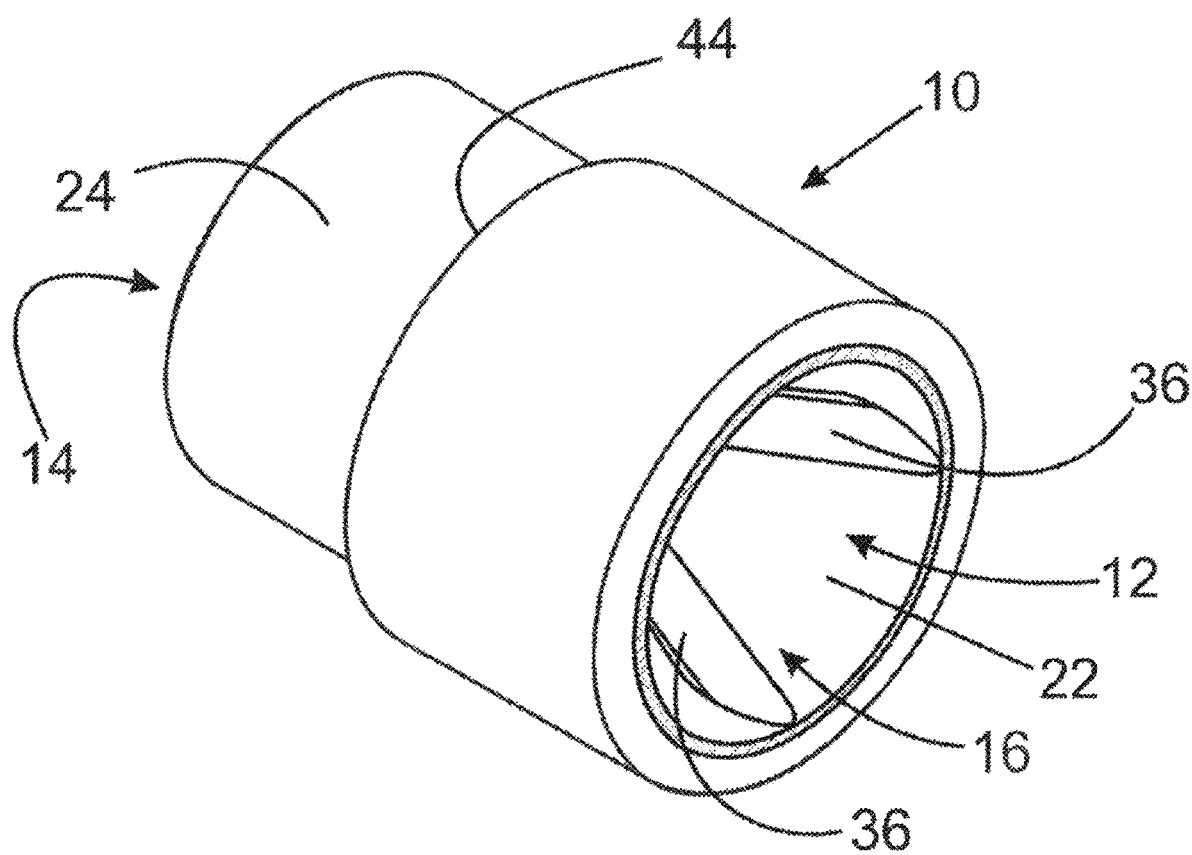
Figure 18:
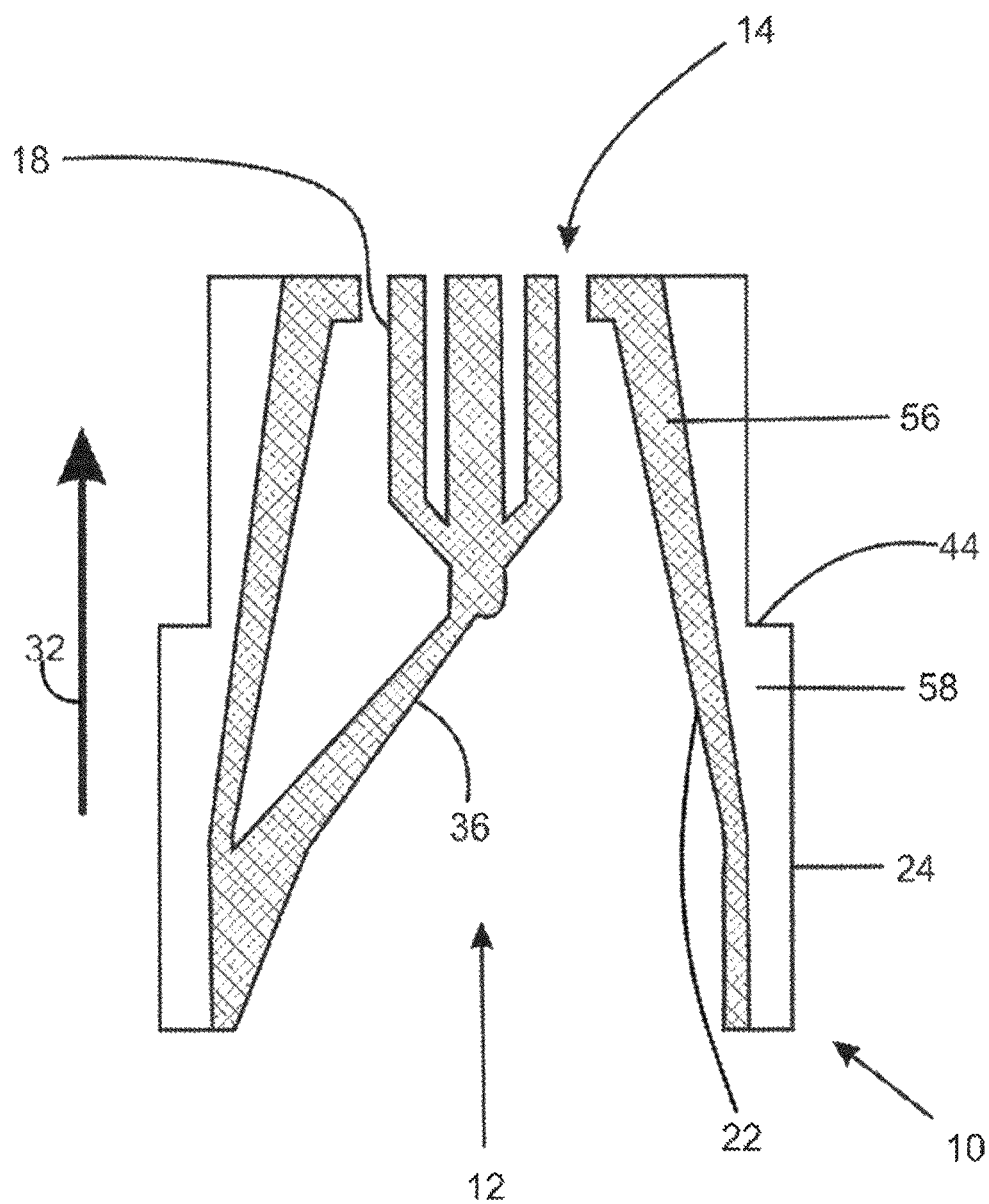
Figure 19:
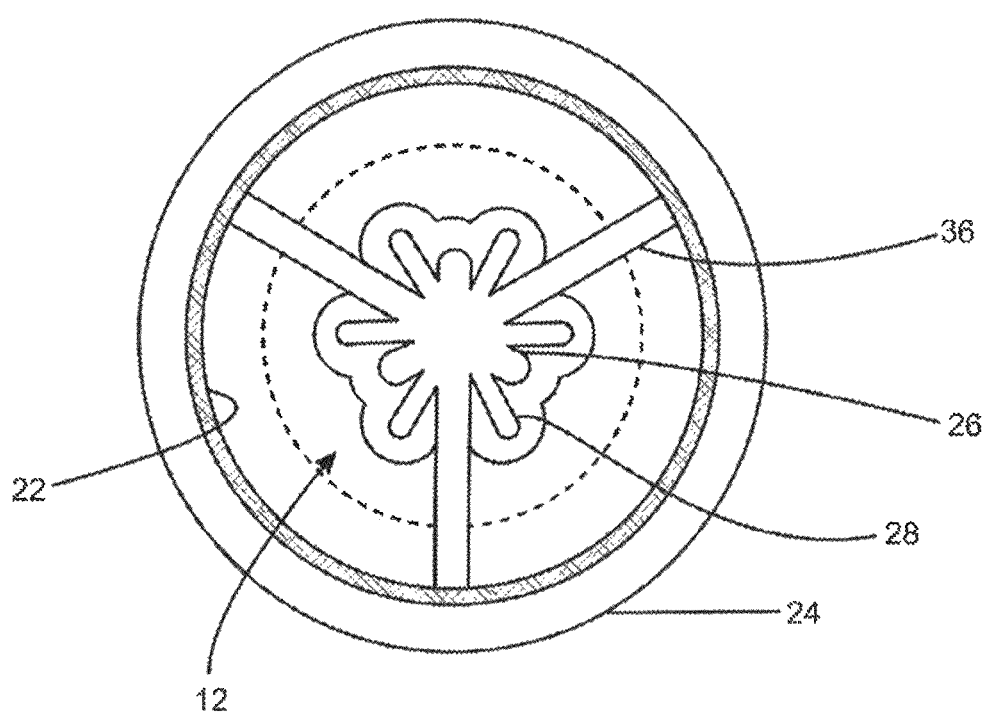
Figure 20:
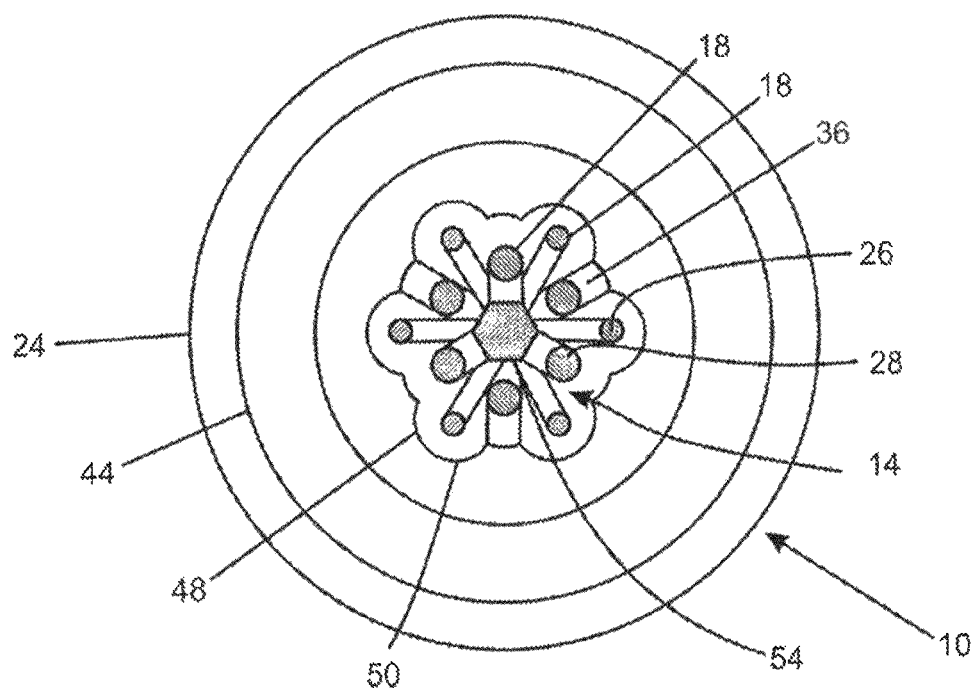
Figure 21:
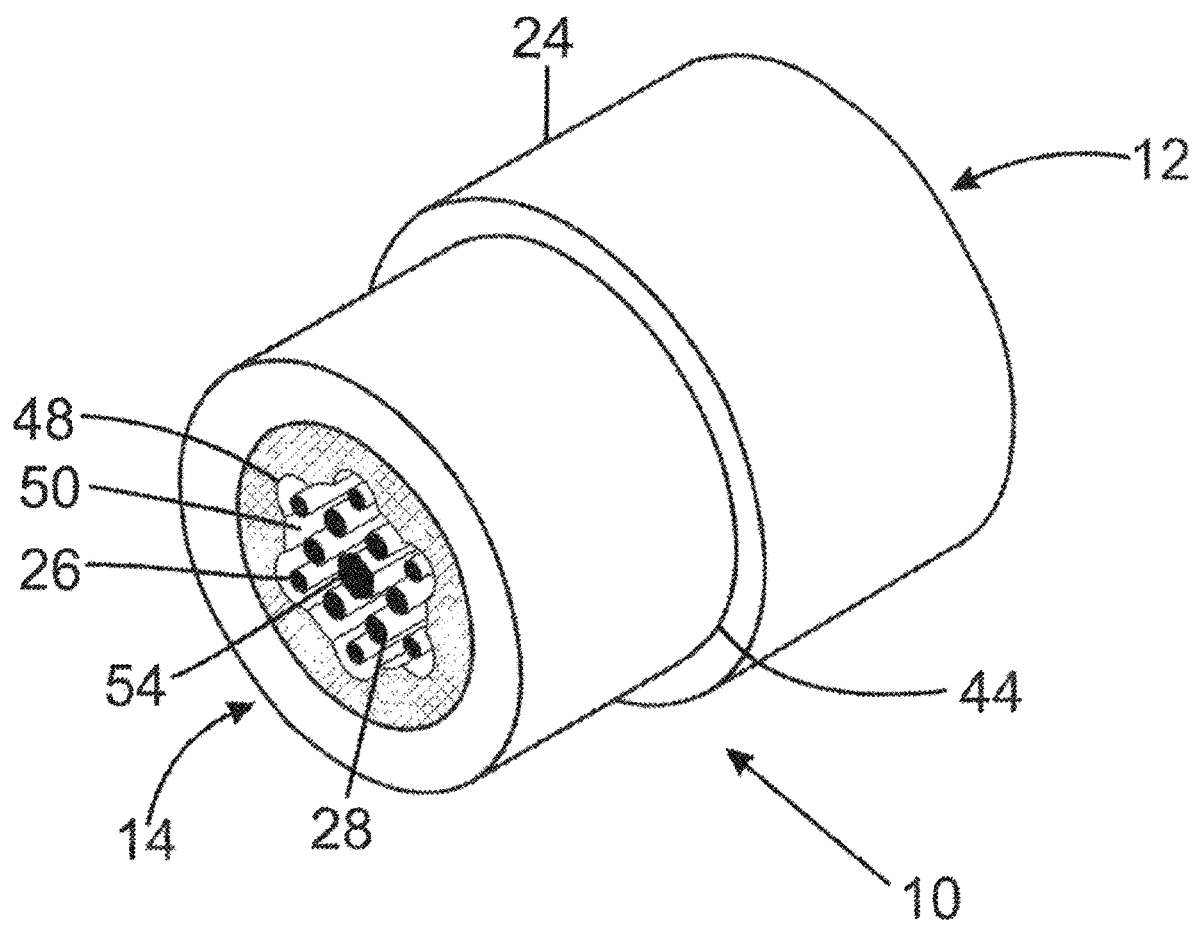
Figure 22:
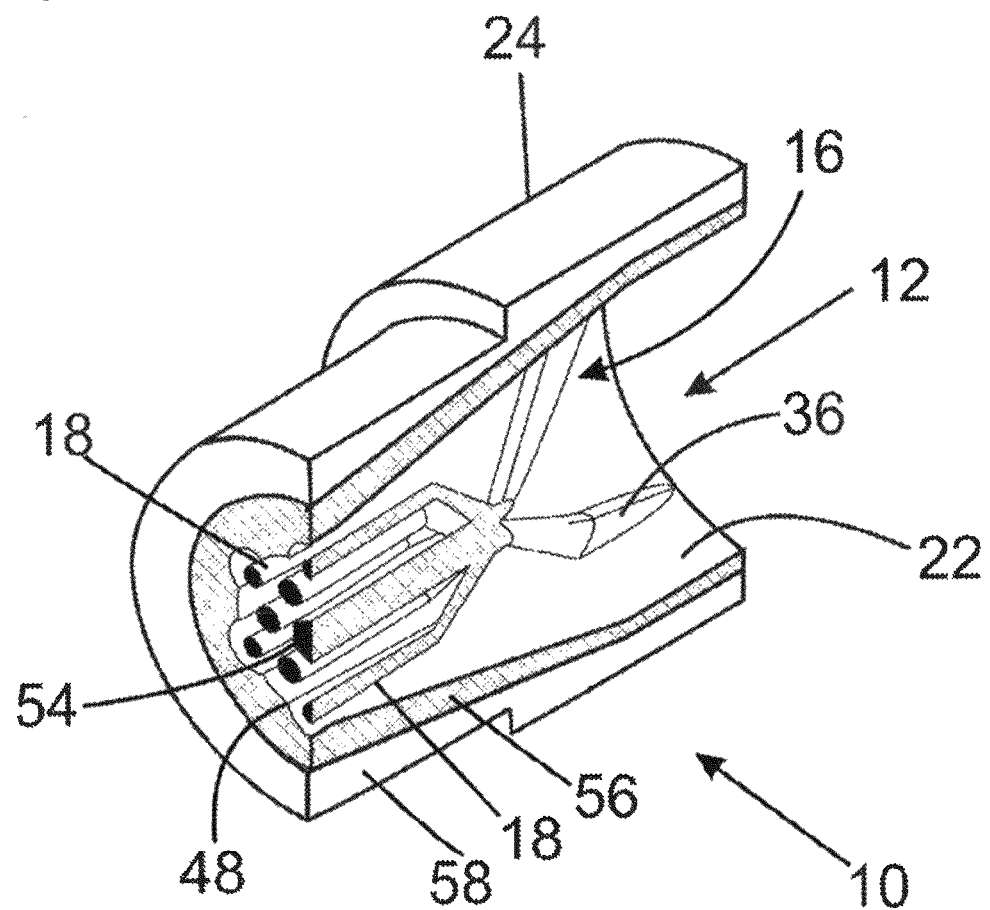
Figure 23:
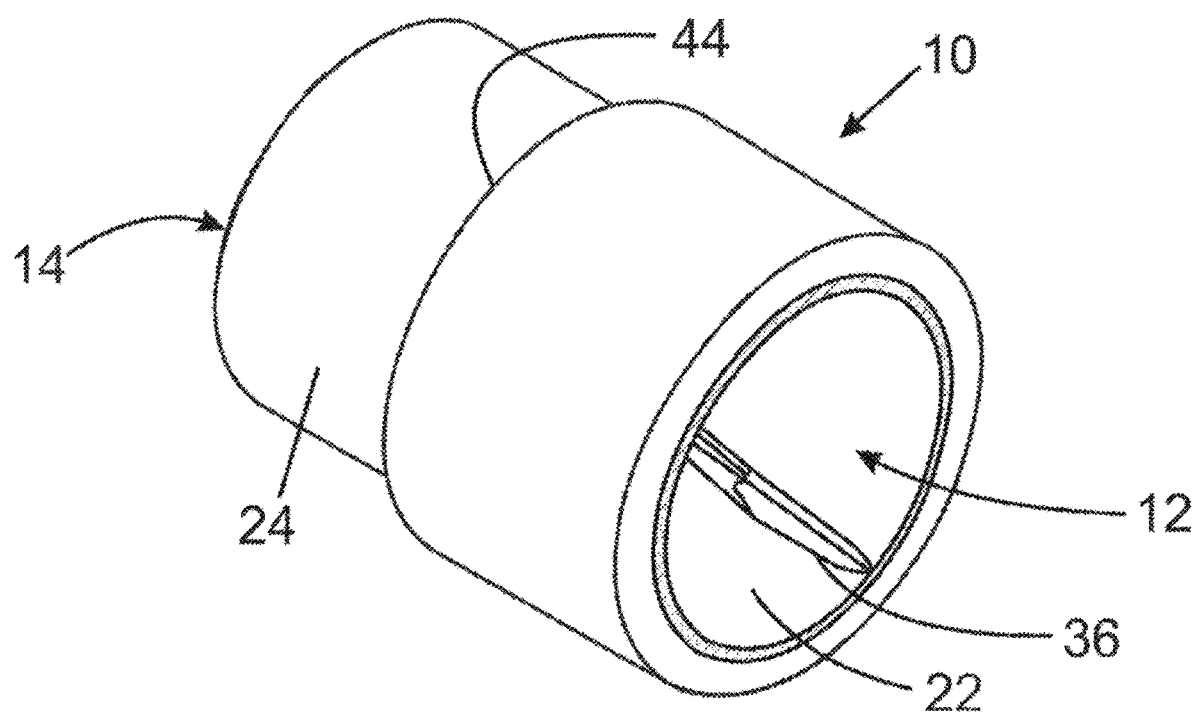
Figure 24:
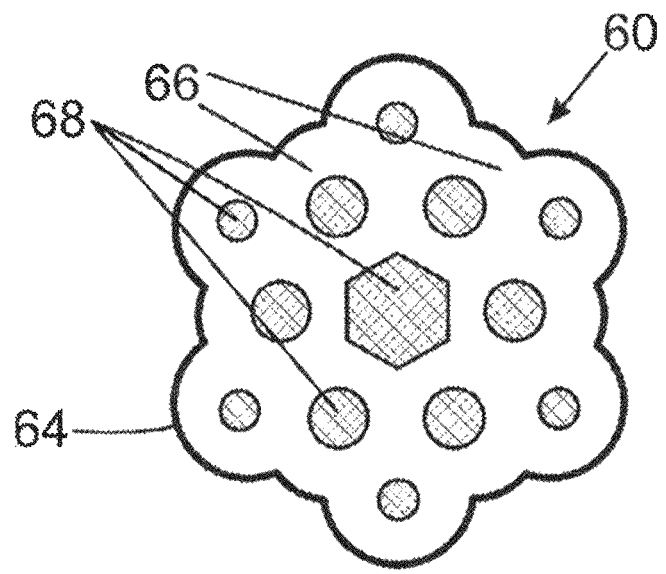
Figure 25:
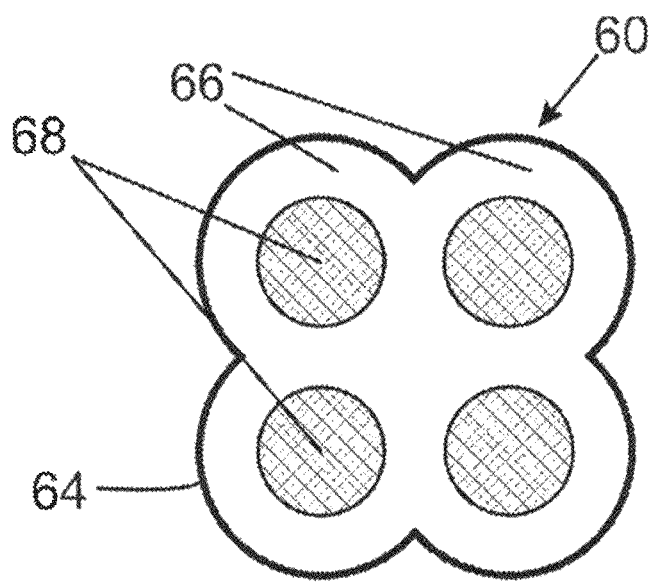
Figure 26:
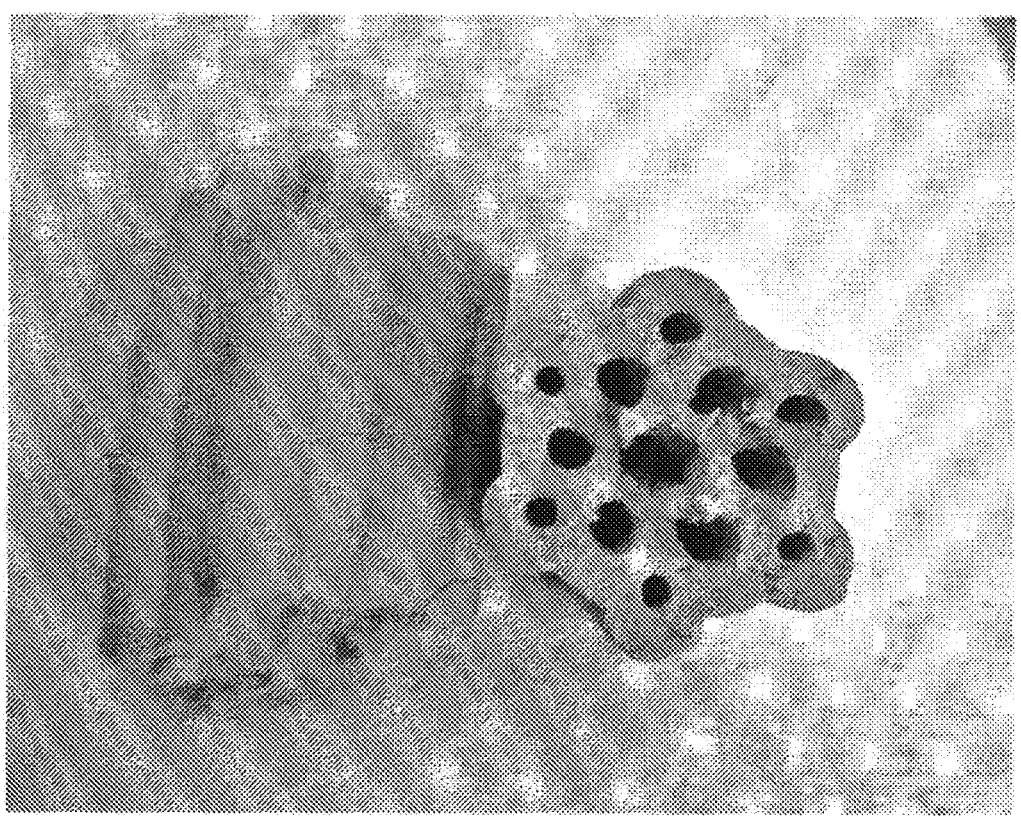
Figure 27:
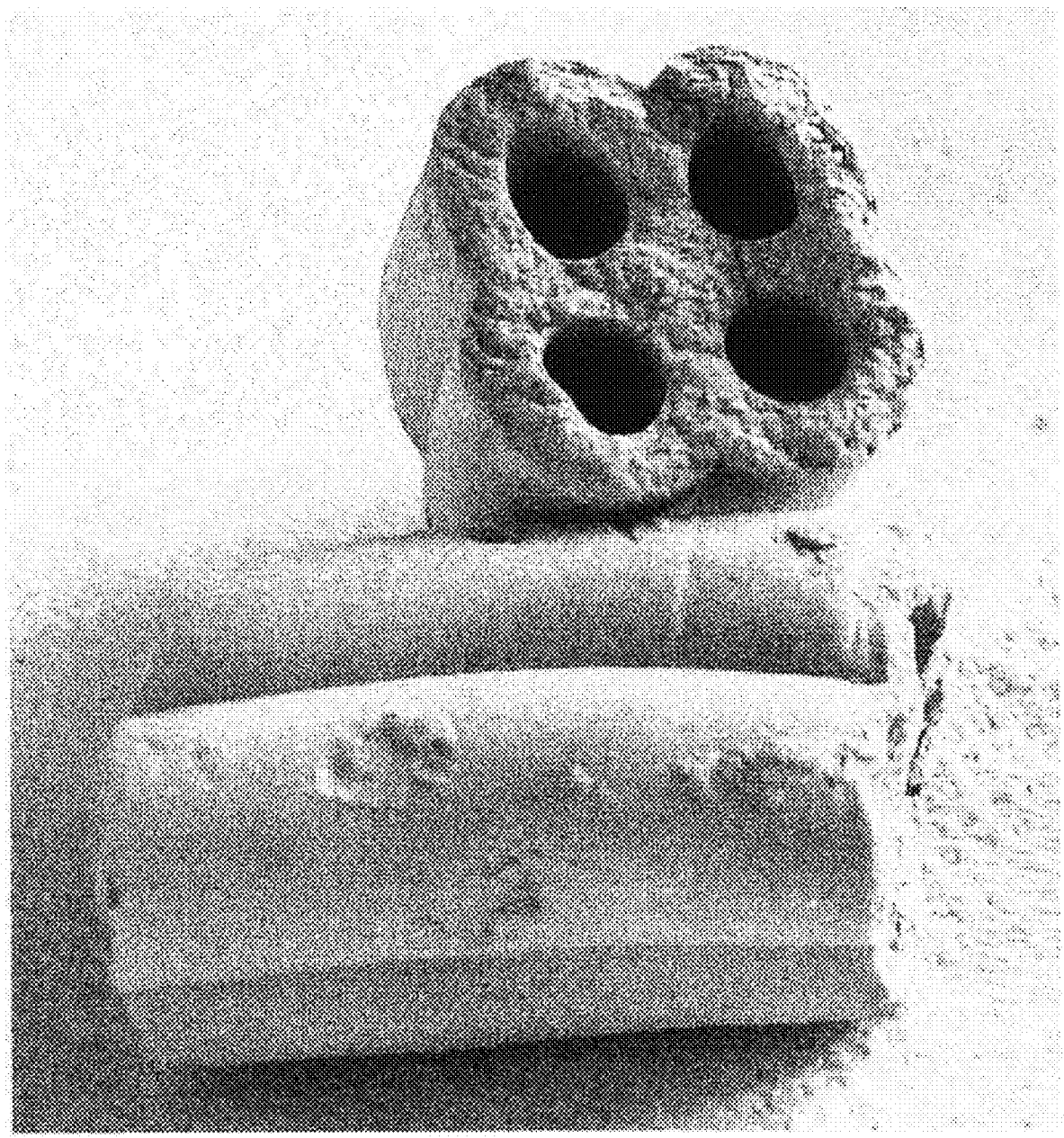

FIG. 3 shows a first embodiment of a die of the invention in longitudinal section FIG. 4 shows a first variant of the embodiment as in FIG. 1 in longitudinal section FIG. 5 shows a second variant of the embodiment as in FIG. 1 in longitudinal section FIG. 6 shows a metal-printed insert as in the second variant depicted in FIG. 3 in longitudinal section FIG. 7 shows a second embodiment of a die of the invention in plan view of the entrance side FIG. 8 shows the second embodiment as in FIG. 7 in plan view of the discharge side FIG. 9 shows the second embodiment as in FIG. 7 in 3D depiction of the discharge side FIG. 10 shows the second embodiment as in FIG. 7 in a sectional 3D depiction FIG. 11 shows the second embodiment as in FIG. 7 in a 3D depiction of the entry side FIG. 12 shows a third embodiment of a die of the invention in longitudinal section FIG. 13 shows the third embodiment as in FIG. 12 in plan view of the entry side FIG. 14 shows the third embodiment as in FIG. 12 in plan view of the discharge side FIG. 15 shows the third embodiment as in FIG. 12 in a 3D depiction of the discharge side FIG. 16 shows the third embodiment as in FIG. 12 in a sectional 3D depiction FIG. 17 shows the third embodiment as in FIG. 12 in a sectional 3D depiction of the entry side FIG. 18 shows a fourth embodiment of a die of the invention in longitudinal section, FIG. 19 shows the fourth embodiment as in FIG. 18 in plan view of the entry side FIG. 20 shows the fourth embodiment as in FIG. 18 in plan view of the discharge side FIG. 21 shows the fourth embodiment as in FIG. 18 in a 3D depiction of the discharge side FIG. 22 shows the fourth embodiment as in FIG. 18 in a sectional 3D depiction FIG. 23 shows the fourth embodiment as in FIG. 18 in a 3D depiction of the entry side FIG. 24 shows a plan view of a molding extruded with a die as in the second or fourth embodiment FIG. 25 shows a plan view of the molding extruded with a die as in the third embodiment FIG. 26 shows a photograph of the molding extruded with a die as in the fourth embodiment FIG. 27 shows a photograph of the molding extruded with a die as in the third embodiment FIGS. 1 and 2 show a die of the prior art. An extrudable composition flows here in flow direction (32) from an entry side (12) to a discharge side (14) of the die. The die comprises a shell (56), the internal side (22) of which has a diameter constriction (38), with a plurality of channel-formers (18) which are displacers of the extrudable composition and extend in flow direction of the extrudable composition. The displacers (18) are formed by metal pins inserted into a metal plate (20) with apertures (42). The metal plate (20) is connected at right angles to the internal side (22) of the shell (56). Below the metal plate (20) there are therefore cavities (62) for receiving extrudable composition which extend at right angles to the flow direction (32) of the extrudable composition. The shell (56) has a jacket (58) made of plastic with an external side (24) with diameter step (44) which serves to retain the die (10).

In the first embodiment, depicted in FIG. 3, of a die of the invention, an extrudable composition flows in flow direction (32) from an entry side (12) to a discharge side (14) of the die. The die comprises a shell (56), the internal side (22) of which has a diameter constriction (38), with a plurality of channel-formers (18), which are displacers of the extrudable composition and extend in flow direction of the extrudable composition. Channel-formers (18) here with a smaller first diameter (26) form a ring surrounding a central channel-former (18) with a greater second diameter (28). There are connections (30) between some of the channel-formers (18), and the channel-formers are connected by way of connecting webs (36) to the interior side wall (22) of the shell (56). The ends (40) of the channel-formers (18) here lie within the plane of the discharge aperture (50). Said connecting webs (36) run at an angle of less than 90° to the interior side wall (22) to the channel-formers (18). The die comprising shell (56), connecting webs (36) and channel-formers (18) has been manufactured from a single piece and produced by 3D metal printing. The shell (56) has a jacket (58) made of plastic with an external side (24) with diameter step (44) which serves to retain the die (10). The dimensioning of the jacket is such that it can be fitted into a die plate intended to receive a plurality of individual dies (10).

In the first variant, depicted in FIG. 4, of the embodiment depicted in FIG. 3, the jacket (58) made of plastic is omitted. The dimensioning of the entire die is such that it can be fitted into a cutout of a die plate.

In the second variant, shown in FIG. 5, of the embodiment depicted in FIG. 3, only an insert (34) comprising connecting webs (36) and channel-formers (18) has been metal-printed. The shell (56) with diameter step (44) and with interior side wall (22) of the die (10) has been manufactured from plastic. The insert (34) is fitted into the shell (56) and has the frictional and interlocking connection thereto.

In FIG. 6, the insert (34) comprising connecting webs (36) and channel-formers (18) for the production of a die as in FIG. 5 is shown separately.

FIGS. 7 to 11 show various depictions of a second embodiment of the die of the invention. Arranged around a central channel-former (18, 54) with hexagonal shape (54) in this embodiment there are channel-formers (18, 52) of rounded shape with a smaller first diameter (26) in an exterior circle and channel-formers (18, 52) of rounded shape with a greater second diameter (28) in a concentric interior circle. The central channel-former (18, 54) has connection by way of three connecting webs (36) to the interior side wall (22) of the shell (56) of the die (10). The exterior and interior channel-formers (18, 52) have connection by way of a respective connecting web (36) to the interior side wall (22) of the die (10). The die has been manufactured from a single piece, and has a jacket (58) made of plastic with a diameter step (44).

FIGS. 12 to 17 show various depictions of a third embodiment of the die of the invention. In contrast to the second embodiment shown in FIGS. 7 to 11, this embodiment has four circular channel-formers (18) of equal size in a square arrangement, with ends (40) lying within the plane of the discharge aperture, thus giving a clover-leaf arrangement with the shaping (48) of the discharge aperture. Each of the four channel-formers has connection to a respective connecting web (36), these together forming a rib system (16).

FIGS. 18 to 23 show various depictions of a fourth embodiment of the die of the invention. Likewise arranged around a central channel-former (18) with hexagonal shape (26) in this embodiment there are channel-formers (18) of rounded shape with a smaller first diameter (28) in an exterior circle and channel-formers (18) of rounded shape with a greater second diameter (54) in a concentric interior circle. In this embodiment, in contrast to the second embodiment shown in FIGS. 7 to 11, all channel-formers (18) have connection to the central channel-former with hexagonal shape (54) and have connection by way of three connecting webs (36) in the manner of a rib system (16) to the interior side wall (22) of the die (10).

FIG. 24 shows a molding (60) extruded with a die of the third embodiment, with a molding shape (64) in the form of a clover leaf corresponding to the shape of the die aperture, and with walls (66) and circular channels (68) in clover-leaf arrangement.

FIG. 25 shows a molding (60) extruded with a die of the second or fourth embodiment, with a molding shape (64) corresponding to the shape of the die aperture, and with walls (66) and circular and, respectively, hexagonal channels (68).

Production of moldings by means of what is known as 3D metal powder laser printing is described by way of example in DE 19649865 C1.

The extrusion dies are produced by using a process for the production of a molding. Production of moldings by means of what is known as 3D metal powder laser printing is described in principle in DE 19649865 C1. This process features construction of the molding from pulverulent metallic material via layer-by-layer construction based on the corresponding three-dimensional CAD data of the model of the extrusion die. The three-dimensional CAD data of the model of the extrusion die are generated with the aid of specific CAD software.

The production process itself features build-up of a metallic material made of successive pulverulent layers. The powder layer is irradiated by an energy source in a prescribed region before the next powder layer is applied. The energy introduced melts the powder, which bonds to give a coherent layer. The selected irradiation energy is such that the material is completely melted over its entire layer thickness. The irradiation is conducted in a plurality of traces over the prescribed region in a manner such that each successive trace to some extent overlaps the preceding trace; the individual traces are thus connected to one another, avoiding production of pores or similar defects. The distance between the traces is selected accordingly. The layering of a plurality of powder layers on top of one another, and irradiation of these, bonds the molten layers resulting from the powder layers applied on top of one another. During the process, an atmosphere of protective gas is maintained, and is effective in the region of the molten metal; this prevents, by way of example, oxidation. The heating of the powder starting material above its melting point, and melting over the entire layer thickness, produces a compact molding with a high level of strength properties.

After the actual production process there can also, as required by the material used and the precise design, be a need for downstream operations. Thermal processes can be considered in this context, for example in order to increase strength or to dissipate stresses. Processes which modify the surface properties of the molding are also used, for example downstream surface-polishing by means of sandblasting.

The invention is elucidated in more detail in the examples that follow.

EXAMPLES

Example 1 Production of 3D Printed Extrusion Dies

Production process: Powderbed Fusion (ASTM, ISO); the following other names are also used as alternatives for the same process (selective laser beam melting (VDI)). Plant manufacturers in particular also use the following names: selective laser sintering, selective laser melting SLM™ (Realizer, SLM Solutions), direct metal laser sintering DMLS® (EOS), LaserCUSING® (Concept Laser) among other trademarks.

Plant description: Concept Laser—M2 curing

CAD software: Autodesk—Inventor 2017 (for 3D modelling)

Slicer software: Materialise—Magics 19 (for preparing the 3D model for printing)

Material used:

Raw material:

stainless steel metal powder

Supplier Concept Laser chemical composition corresponding to X2 CrNiMo 17-13-2, 316L, 1.4404.

Particle size distribution: $D_{10}$=18.72 µm, $D_{50}$=30.10 µm, $D_{90}$=45.87 µm substantially round particle shape Properties of material:

hardness: 190-220 HV density: 99.5%-99.9% elongation at break: 41%-52% minimal tensile strength $R_{m,\ min}$: >614 MPa minimal yield strength $R_{p,0.2,\ min}$: >486 MPa Alternative material:

preferably metallic material preferably high abrasion resistance (tool steel)

almost all metals, and also harder plastics, should be acceptable particle size preferably below 100 µm, preferably between 10 µm and 50 µm Process parameters used:

Process parameters protective gas: Nitrogen layer thickness: 25 µm laser power output: 150-380 W laser spot diameter: 100 µm laser spot velocity: 300-1100 mm/s Alternative process parameters:

protective gas: Preferably noble gas, depending on the reactivity of the metal used layer thickness: Preferably below 60 µm Laser power output: Preferably between 50-600 W, depending on the other process parameters laser spot diameter: preferably below 500 μm laser spot velocity: Preferably 100-8000 mm/s "Autodesk—Inventor 2017" was used here to generate the three-dimensional CAD data of the model of the extrusion die. After modelling of the three-dimensional model, this is converted to an STL format in which the surface of the model is described by triangular faces. The STL format serves for relatively simple further processing of the model in specific data-processing software. The program used here is Materialise—Magics. This program uses a build processor to determine the parameters and strategies used in the subsequent production process. The output computer file is then read directly at the 3D printer.

In the present case the actual production process is followed by low-stress annealing for six hours, and support structures are removed by machining.

Example 2 Production of a Catalyst Composition 0.8991 kg (30% by weight, based on the mixture of the diatomaceous earths) of a diatomaceous earth of type MN from EP Minerals, 1.4985 kg (50% by weight, based on the mixture of the diatomaceous earths (of a diatomaceous earth of type Masis from Diatomite SP CJSC and 0.5994 kg (20% by weight, based on the mixture of the diatomaceous earths) of a diatomaceous earth of type Diatomite 1 from Mineral Resources Ltd. are mixed for 30 minutes at 45 revolutions per minute in a Röhnrad mixer (Engelsmann, container volume 32 liters). The mixture of the diatomaceous earths is charged to a Mix-Muller (Simpson, year of construction 2007, container volume 30 liters) and mixed for 2 minutes at 33 revolutions per minute. A first solution consisting of 1.3706 kg of aqueous KOH solution (47.7% by weight) and 0.532 kg of ammoniumpolyvanadate (Treibacher) is then added over a period of 2 minutes and mixing is continued for 1 minute. 2.1025 kg of 48 percent sulfuric acid are added over a period of 2 minutes, and stirring is continued for one minute at 33 revolutions per minute. 0.3 kg of $K_2SO_4$ (K+S Kali GmbH) is next added to 1.587 kg of a 50 percent aqueous $Cs_2SO_4$ solution, and this is added to the Mix-Muller over a period of 2 minutes and mixed at 33 revolutions per minute for one further minute, and then 180 g of a starch solution (7.39% by weight of potato starch in deionized water) are added, with continued mixing. The resultant composition is then further mixed at 33 revolutions per minute until the total mixing time from addition of the diatomaceous earth is 15 minutes.

Examples 3 and 4 Production of Catalyst Moldings

The geometry of the molding is determined by a die through which the composition to be extruded is conveyed under high pressure. Dies as in FIGS. 18 to 23 (example 3) and 12 to 17 (example 4) were used. The extruded moldings and geometries as in FIGS. 24 and, respectively, 25.

A screw extruder with a single screw is used here. Solids are fed into the screw from above. The extruder is water-cooled. The rotation rate of the conveying screw in the extruder is 10 revolutions per minute. The temperature of the solid during feed and of the moldings on discharge from the extruder is around 50° C. The throughput through an extruder is 6000 kg per day For reasons including non-constant conveying velocity of the strands, result is a length distribution, rather than a uniform length. The average length is moreover dependent on the geometry of the die. The moldings are then dried at 120° C. for 2 h and then calcined at 475° C. for 3 h. Excessively large and excessively small moldings are removed by way of sieve devices.

The resultant extrudates are shown in FIGS. 26 (example 3) and 27 (example 4).

LIST OF REFERENCE SIGNS

10 Die
12 Entry side of die
14 Discharge side of die
16 Grid system
18 Channel-formers (≙Displacers, ≙Pins)
20 Metal plate
22 Interior side wall of die
24 External wall of jacket
26 First diameter of channel-formers
28 Second diameter of channel-formers
30 Connection of channel-formers
32 Flow direction of extrudable composition
34 Metal-printed insert
36 Connecting web
38 Diameter constriction of interior side wall
40 End of channel-formers
42 Apertures of metal plate
44 Diameter step of jacket
48 Shaping of discharge aperture
50 Discharge aperture
52 Round shape of channel-formers
54 Polygonal shape of channel-formers
56 Shell
58 Jacket
60 Extruded catalyst moldings, support or adsorbent moldings
62 Cavity
64 Shape of extruded moldings
66 Walls of extruded moldings
68 Channels of extruded moldings

The invention claimed is:

1. A die for extrusion of catalyst moldings, catalyst-support moldings or adsorbent moldings in flow direction of an extrudable composition from an entry side to a discharge side of the die comprising a shell and one or more channel-formers which are displacers of the extrudable composition and which extend in said flow direction of the extrudable composition, where said channel-formers which are displacers of said extrudable composition have been secured by way of one or more connecting webs directly to an interior side wall of the die, wherein the die is free from connections running at right angles from channel-formers to the interior side wall of the die and is free from cavities for receiving extrudable composition which extend at right angles to the flow direction of the extrudable composition, and wherein the channel-formers have been metal-printed.

2. The die according to claim 1, wherein the channel-formers have a connection to one another.

3. The die according to claim 1, wherein some of the channel-formers have connection to one another.

4. The die according to claim 1, wherein, for the extrusion of catalyst moldings or of support moldings, the die's one or more channel-formers comprise 2 to 20 channel-formers parallel to the flow direction of the extrudable composition.

5. The die according to claim 1, wherein the channel-formers extending in said flow direction of the extrudable composition have first and second diameters different from one another, and have a circular or polygonal shape.

6. The die according to claim 1, wherein the die is composed of a metal-printed insert in which the channel-formers and said connecting webs are present.

7. The die according to claim 6, wherein the shell has been manufactured from a plastics material.

8. The die according to claim 6, wherein the shell has been manufactured from a Teflon.

9. The die according to claim 1, wherein the shell and the channel-formers connected by way of said connecting webs to said interior side wall have been manufactured from a single piece and have been metal-printed.

10. The die according to claim 9, wherein the shell has an exterior jacket which serves to retain the die.

11. The die according to claim 10, wherein the exterior jacket has been manufactured from a plastics material.

12. The die according to claim 10, wherein the exterior jacket has been manufactured from a Teflon.

13. A metal-printed insert with channel-formers and with connecting webs for the production of a die according to claim 6.

14. A die for extrusion of catalyst moldings, catalyst-support moldings or adsorbent moldings in flow direction of an extrudable composition from an entry side to a discharge side of the die comprising a shell, an interior side wall wherein at least a portion extends parallel to the flow direction, and one or more channel-formers which are displacers of the extrudable composition and which extend in said flow direction of the extrudable composition, where said channel-formers which are displacers of said extrudable composition have been secured by way of one or more connecting webs directly to the portion of the interior side wall that extends parallel to the flow direction, wherein the die is free from connections running at right angles from channel-formers to the portion of the interior side wall that extends parallel to the flow direction and is free from cavities for receiving extrudable composition which extend at right angles to the flow direction of the extrudable composition, and wherein the channel-formers have been metal-printed.

* * * * *